(12) United States Patent
Gong et al.

(10) Patent No.: US 11,558,497 B2
(45) Date of Patent: *Jan. 17, 2023

(54) MOBILE TERMINAL

(71) Applicant: GUANGDONG OPPO MOBILE TELECOMMUNICATIONS CORP., LTD., Guangdong (CN)

(72) Inventors: Guan Gong, Guangdong (CN); Xiaoyu Fan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 346 days.

This patent is subject to a terminal disclaimer.

(21) Appl. No.: 17/068,461

(22) Filed: Oct. 12, 2020

(65) Prior Publication Data
US 2021/0058500 A1 Feb. 25, 2021

Related U.S. Application Data

(63) Continuation of application No. 16/563,349, filed on Sep. 6, 2019, now Pat. No. 10,812,640.

(30) Foreign Application Priority Data

Sep. 7, 2018 (CN) .......................... 201821472113.1

(51) Int. Cl.
*H04M 1/00* (2006.01)
*H04M 1/02* (2006.01)
(52) U.S. Cl.
CPC ................. *H04M 1/0264* (2013.01)
(58) Field of Classification Search
CPC ........... H04W 52/365; H04W 72/1284; H04W 72/1289; H04W 72/14; H04L 5/0048
(Continued)

(56) References Cited

U.S. PATENT DOCUMENTS 9,031,610 B2   5/2015  Kulas
9,520,984 B2 * 12/2016 Yang ......................... H04L 1/18
(Continued)

FOREIGN PATENT DOCUMENTS

CN   106713549   5/2017
CN   106817450   6/2017
(Continued)

OTHER PUBLICATIONS

IPI, Office Action for IN Application No. 201914036088, dated Mar. 16, 2021.
(Continued)

*Primary Examiner* — Kathy W Wang-Hurst
*Assistant Examiner* — Max Mathew
(74) *Attorney, Agent, or Firm* — Hodgson Russ LLP

(57) ABSTRACT

The present disclosure discloses a mobile terminal. The mobile terminal includes a housing, a display screen, a functional module and a rotating member, the housing defines a recess and a first engaging structure; the display screen is positioned in the housing; the rotating member is rotatably coupled to the housing, wherein the functional module is mounted on the rotating member, the rotating member comprises a second engaging structure cooperated with the first engaging structure, one of the first engaging structure and the second engaging structure is a curved slot communicated with the recess, the other one of the first engaging structure and the second engaging structure is a slider slidably engaged in the curved slot thereby enabling the rotating member to rotate according to an axis of the curved slot, such that the functional module is positioned in the recess or exposed from the housing.

20 Claims, 33 Drawing Sheets

(58) Field of Classification Search
USPC .................................................... 455/556.1
See application file for complete search history.

(56) References Cited

U.S. PATENT DOCUMENTS

| | | | | |
|---|---|---|---|---|
| 9,603,098 | B2* | 3/2017 | Ryoo | H04W 76/27 |
| 9,629,097 | B2* | 4/2017 | Ahn | H04W 52/34 |
| 10,326,562 | B2* | 6/2019 | Kim | H04W 72/042 |
| 2001/0029167 | A1* | 10/2001 | Takeda | H04N 5/23293 |
| | | | | 348/E5.042 |
| 2002/0109965 | A1 | 8/2002 | Horiki | |
| 2006/0164799 | A1 | 7/2006 | Varela | |
| 2012/0044882 | A1* | 2/2012 | Kim | H04L 5/00 |
| | | | | 370/328 |
| 2012/0294167 | A1* | 11/2012 | Zhu | H04W 52/146 |
| | | | | 370/252 |
| 2012/0314619 | A1* | 12/2012 | Wiberg | H04W 74/006 |
| | | | | 370/254 |
| 2013/0051259 | A1* | 2/2013 | Kim | H04W 72/0446 |
| | | | | 370/252 |
| 2013/0100925 | A1* | 4/2013 | Ahn | H04L 5/0098 |
| | | | | 370/329 |
| 2016/0100407 | A1* | 4/2016 | Gaal | H04L 5/0048 |
| | | | | 370/329 |
| 2017/0078983 | A1* | 3/2017 | Ahn | H04W 52/38 |
| 2017/0290014 | A1* | 10/2017 | Kim | H04W 4/06 |
| 2018/0048498 | A1* | 2/2018 | Stern-Berkowitz | |
| | | | | H04W 72/1215 |
| 2018/0167823 | A1* | 6/2018 | Uchino | H04W 16/14 |
| 2018/0376434 | A1* | 12/2018 | Cui | H04W 72/1289 |
| 2019/0045458 | A1* | 2/2019 | Harada | H04W 72/08 |

FOREIGN PATENT DOCUMENTS

| | | |
|---|---|---|
| CN | 107295129 | 10/2017 |
| CN | 107707698 | 2/2018 |
| CN | 207491002 | 6/2018 |
| CN | 207603716 | 7/2018 |
| CN | 208806829 | 4/2019 |
| CN | 209105223 | 7/2019 |
| KR | 20070068662 | 7/2007 |
| KR | 20090002524 | 1/2009 |

OTHER PUBLICATIONS

WIPO, English translation of the ISR and WO for PCT/CN2019/104794, dated Nov. 27, 2019.
EPO, Search Report for EP Application No. 19195861.0, dated Jan. 10, 2020.

* cited by examiner

MOBILE TERMINAL

CROSS REFERENCE

This application is a continuation of U.S. application Ser. No. 16/563,349 filed on Sep. 6, 2019, which claims priority to Chinese Patent Application No. 201821472113.1, filed on Sep. 7, 2018, the entire disclosures of which are incorporated herein by reference.

TECHNICAL FIELD

The disclosure relates to the field of mobile terminal technologies, and in particular, to a mobile terminal.

BACKGROUND

Nowadays, in order to obtain a better user experience, the demand for large screen display of mobile phones is becoming more and more urgent. However, since the front of the mobile phone usually needs to be arranged by such as a camera module, which limits the layout space of the display, and the screen to body ratio of the mobile phone is difficult to increase.

SUMMARY

The disclosure provides a mobile terminal with high screen to body ratio.

According to an embodiment of the disclosure, the mobile terminal includes a housing, a display screen, a functional module and a rotating member, the housing defines a recess and a first engaging structure; the display screen is positioned in the housing; the rotating member is rotatably coupled to the housing, wherein the functional module is mounted on the rotating member, the rotating member comprises a second engaging structure cooperated with the first engaging structure, one of the first engaging structure and the second engaging structure is a curved slot communicated with the recess, the other one of the first engaging structure and the second engaging structure is a slider slidably engaged in the curved slot, thereby enabling the rotating member to rotate according to an axis of the curved slot, such that the functional module is positioned in the recess or exposed from the housing.

According to another embodiment of the disclosure, the mobile terminal includes a housing, a rotating member, a display screen, and a camera module, the housing defines a recess and a first engaging structure, the housing includes a body portion and a protrusion portion. the rotating member is rotatably coupled to the housing to turn out of the recess or into the recess, the rotating member comprises a second engaging structure cooperated with the first engaging structure, one of the first engaging structure and the second engaging structure is a curved slot communicated with the recess, the display screen is positioned in the housing, wherein the display screen comprises a displaying surface, the body portion is flush with the displaying surface, and the protrusion portion is protruded from the body portion away from the displaying surface, a part of the recess is disposed in the protrusion portion, and another portion of the recess is disposed in the body portion; the camera module is disposed on the rotating member and coupled to the rotating member in such a manner that the camera module is received in the recess or exposed from the housing.

According to another embodiment of the disclosure, the mobile terminal includes a housing, a rotating member, and a camera module, the housing defines a recess and a first engaging structure in the housing; the rotating member is rotatably coupled to the housing to turn out of the recess or into the recess, the rotating member includes a second engaging structure cooperated with the first engaging structure; the camera module is disposed on the rotating member to exposed from the housing when the rotating member is turned out of the recess and to be hidden by the housing when the rotating member is turned into the recess, wherein the camera module is disposed far away from the first engaging structure and the second engaging structure.

DETAILED DESCRIPTION OF EMBODIMENTS

Figure 1:
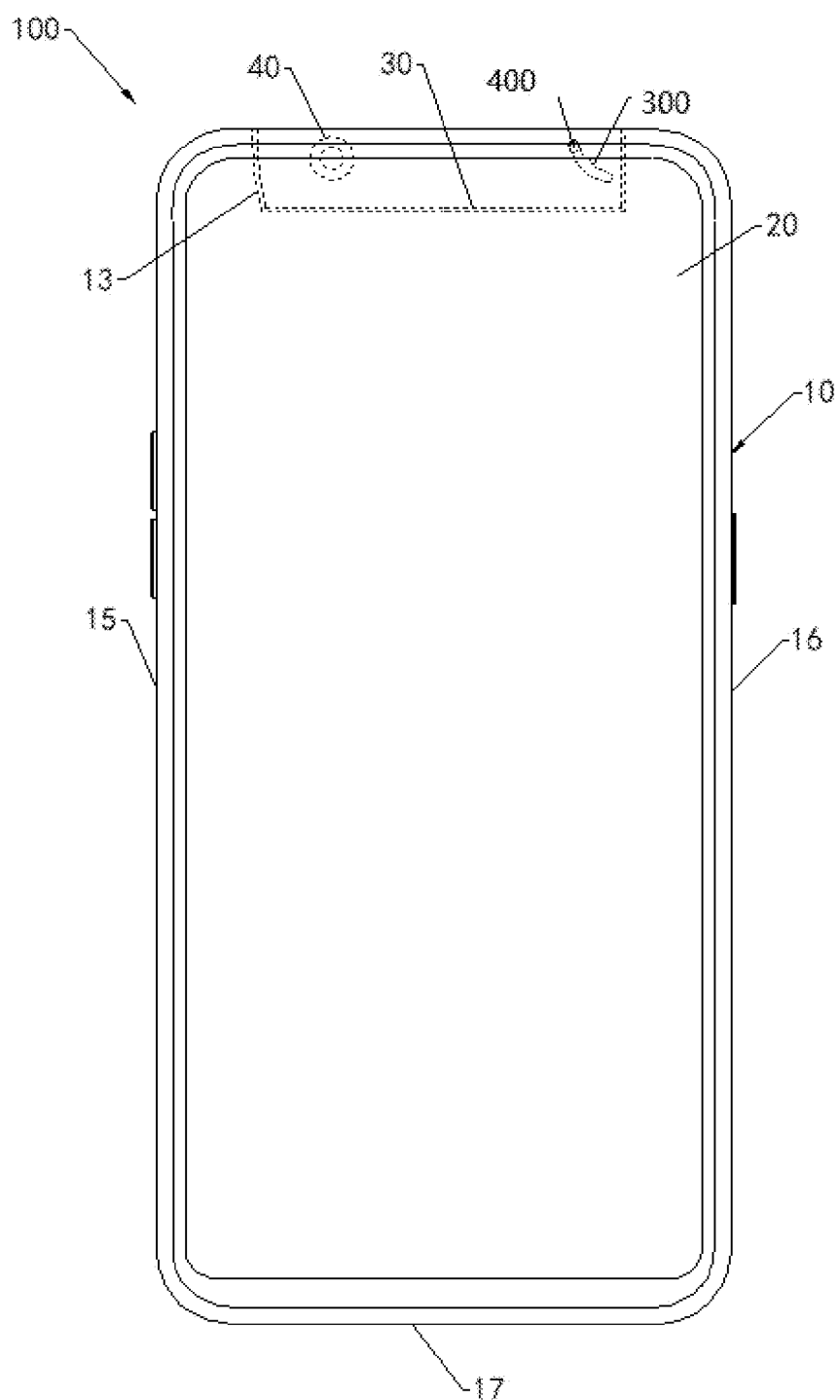
FIG. 1 illustrates a configuration diagram of a mobile terminal provided by an embodiment of the present disclosure.

The embodiments of the present disclosure are described in detail below, and the examples of the embodiments are illustrated in the drawings, wherein the same or similar reference numerals indicate the same or similar elements or elements having the same or similar functions. The embodiments described below with reference to the drawings are intended to be illustrative of the disclosure and are not to be construed as limiting.

In the present disclosure, a communication terminal arranged to communicate through a wireless interface may be referred to as a "wireless communication terminal", a "wireless terminal" or a "mobile terminal." As used herein, a "communication terminal" (or simply "terminal") includes, but is not limited to, is configured to be connected via a wireline (e.g., via a public switched telephone network (PSTN), digital subscriber line (DSL), digital cable, direct Cable connection, and/or another data connection/network) and/or via (e.g. for a cellular network, a wireless local area network (WLAN), a digital television network such as a DVB-H network, a satellite network, an AM-FM broadcast transmitter, And/or means for receiving/transmitting a communication signal by a wireless interface of another communication terminal. Examples of mobile terminals include, but are not limited to, satellite or cellular telephones; personal communication system (PCS) terminals that may combine cellular radiotelephone with data processing, fax, and data communication capabilities; may include radiotelephones, pagers, Internet/intranet access, PDAs for web browsers, memo pads, calendars, and/or global positioning system (GPS) receivers; and conventional laptop and/or palm-sized receivers or other electronic devices including radiotelephone transceivers.

Referring to FIG. 1, an embodiment of the present disclosure provides a mobile terminal 100. The mobile terminal 100 includes a housing 10, a display screen 20, a rotating member 30, and a functional module. It will be appreciated that display screen 20 is the area in which the electronic image is displayed. The display screen 20 may be an organic electroluminescent display or a liquid crystal display. The functional module may be a camera module 40. The number of camera modules 40 is not specifically limited in this disclosure.

When the number of camera modules 40 is plural, each camera module 40 may have a different shooting function. For example, when the number of camera modules 40 is two, one of the camera modules 40 may be a color camera module and the other camera module 40 may be a black and white camera module.

When the number of camera modules 40 is two, one camera module 40 may also be a telephoto camera module, and the other camera module 40 may also be an auxiliary camera module, for example, a wide-angle camera module. The specific settings are based on actual conditions. In one embodiment, the rotating member 30 is made of the same material as the housing 10, specifically, the material of the housing 10 may be, but is not limited to aluminum or stainless steel.

Figure 2:
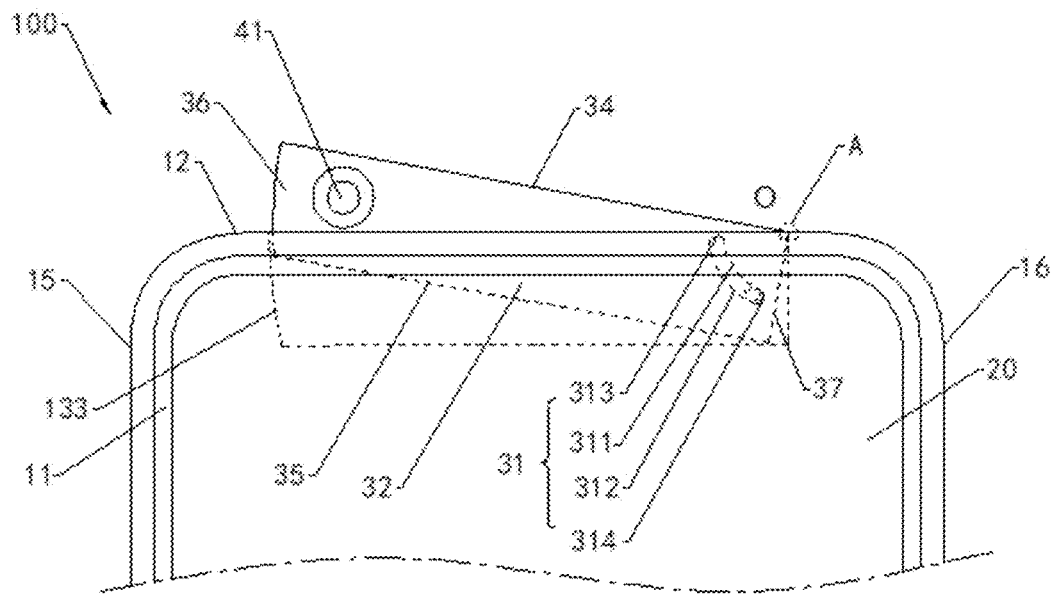
FIG. 2 illustrates a structural diagram of the mobile terminal shown in FIG. 1 in another use state.

As shown in FIGS. 1 and 2, the housing 10 includes a front surface 11 and a first side surface 12 connecting the front surface 11. The front surface 11 refers to the surface of the housing 10 that faces the user. The first side surface 12 may be a front housing 11 connected to a top surface 10 or may be a side surface of both side surfaces of the housing 10.

As shown in FIG. 2, the first side surface 12 is the top surface of the housing 10. The housing 10 defines a recess 13. The recess 13 is recessed from the first side surface 12 toward the interior of the housing 10, i.e., the opening of the recess 13 is at least partially disposed on the first side 12. The shape of the side walls defining the recess 13 may be adapted to the shape of the rotating member 30.

Furthermore, the display screen 20 is positioned in the housing 10. Specifically, the display screen 20 is mounted on the front surface 11. At this time, the housing 10 may be used to protect the display screen 20, that is, to prevent the display screen 20 from being damaged or cracked during a drop or touch. Further, the rotating member 30 is rotatably coupled to the housing 10. The camera module 40 is attached to the rotating member 30, and an image collecting plane 41 of the camera module 40 toward the display screen 20, i.e., the camera module 40 may be used to display the image captured front 20.

The housing 10 defines a first engaging structure 300. The rotating member 30 is rotatably coupled to the housing 10. The camera module 40 is mounted on the rotating member 30. The rotating member 30 includes a second engaging structure 400 cooperated with the first engaging structure 300. One of the first engaging structure 300 and the second engaging structure 400 is a curved slot 31 communicated with the recess 13. An axis O of the curved slot 31 is perpendicular to the display screen 20 thereby enabling the rotating member 30 to rotate according to the axis O of the curved slot 31, such that the camera module 40 is received in the recess 13 or exposed from the housing 10. In the other embodiment, the first engaging structure 300 may be the slider 14, and the second engaging structure 400 may be the curved slot 31. The slider 14 is slidably engaged in the curved slot 31.

As shown in FIG. 1 and FIG. 2, one of the rotating member 30 and the housing 10 is provided with a curved slot 31, and the other is provided with a slider 14, that is, when the rotating member 30 is provided with a curved slot 31, the housing 10 is provided with a slider 14. When the rotating member 30 is provided with the slider 14, the housing 10 is provided with a curved slot 31. The curved slot 31 includes a first groove wall 311 and a second groove wall 312 opposite to the first groove wall 311 and a first end wall 313 and a second end wall 314 disposed opposite the first end wall 314. The first end wall 313 and the second end wall 314 is connected between the first groove wall 311 and the second groove wall 312.

A center plane 312 is formed between the first groove wall 311 and the second groove wall 312, the distance between the first groove wall 311 and the center plane 311 is equal to the distance between the center plane 312 and the second groove wall 312. The axis of the center plane 312 is the axis of the curved slot 31, and the vertical distance from each point on the center plane to the axis are the same. In other words, the curved slot 31 has a center on the plane of rotation of the rotating member 30, and the axis of the curved slot 31 passes through the center of the circle and is perpendicular to the plane of rotation.

Referring again to FIG. 1 and FIG. 2, the slider 14 is slidably mounted to the curved slot 31 such that the rotating member 30 carries the camera module 40 to rotate out or rotate into the recess 13 about the axis O of the curved slot 31. When the slider 14 is close to the first end wall 313, the rotating member 30 carries the camera module 40 into the recess 13 around the axis of the curved slot 31. At this time, the rotating member 30 is received in the recess 13, that is, the image collecting plane 41 of the camera module 40 is blocked by the housing 10. When the slider 14 is close to the second end wall 314, the rotating member 30 carries the camera module 40 to rotate out of the recess 13 around the axis of the curved slot 31. At this time, the image collecting plane 41 of the camera module 40 is exposed relative to the housing 10, that is, the image collecting surface 41 of the camera module 40 is not blocked by the housing 10. The axis O is defined at the intersection of the rotating member 30 and the housing 10.

In the present embodiment, since the rotating member 30 may carry the camera module 40 into or out of the recess 13, when the shooting is required, the rotating member 30 may carry the camera module 40 out of the recess 13 for shooting, when no shooting is required, the rotating member 30 carries the camera module 40 turned into the recess 13, so that the camera module 40 does not need to occupy the space of the front surface of the mobile terminal 100, and the display screen 20 may be arranged as large as possible on the front surface of the mobile terminal 100, so that the mobile terminal 100 screen accounted for relatively high.

For example, the screen to body ratio of the mobile terminal 100 may be as high as 85% or even 95%. The screen ratio refers to a ratio of a display area of a screen of the mobile terminal 100 (such as the display screen 20) to a projected area of the mobile terminal 100 in a vertical plane in the thickness direction of the mobile terminal 100.

In the present disclosure, the slider 14 moves in the curved slot 31, and the curved slot 31 defines a movement trail of the slider 14, thereby defining a movement trail of the rotating member 30 fixed to the slider 14, so that the rotating member 30 rotates about the axis of the curved slot 31.

In the present disclosure, the curvature of the curved slot 31 is less than or equal to $2\pi/5$. The angle at which the rotating member 30 rotated relative to the first side surface 12 is limited by the curvature of the curved slot 31. In the present disclosure, the camera module 40 is located at one end of the rotating member 30 away from the axis of the curved slot 31, so that when the rotating member 30 is rotated by a small angle with respect to the first side 12, the camera module 40 may be exposed relative to the housing 10.

In this embodiment, the slider 14 has various arrangements.

In one embodiment 1, as shown in FIGS. 1 and 2, the number of the slider 14 is one. The outer peripheral surface of the slider 14 abuts against the first groove wall 311 and the second groove wall 312. The slider 14 may be, but is not limited to, a cylinder. When the rotating member 30 rotates out of the recess 13, the slider 14 scrolls from the first end wall 313 to the second end wall 314, that is, the outer circumferential surface of the slider 14 scrolls on the first groove wall 311 and the second groove wall 312. When the rotating member 30 is turned into the recess 13, the slider 14 is rolled from the second end wall 314 toward the first end wall 313. At this time, the outer peripheral surface of the slider 14 is on the first groove wall 311 and the second groove wall 312.

Furthermore, since the outer circumferential surface of the slider 14 abuts against the first channel wall 311 and the second groove wall 312, such that the movement direction of the rotating member 30 is restricted, the slider 14 does not emerge from the recess 13, the rotating member 30 may rotate about the axis of the curved slot 31.

Figure 3:
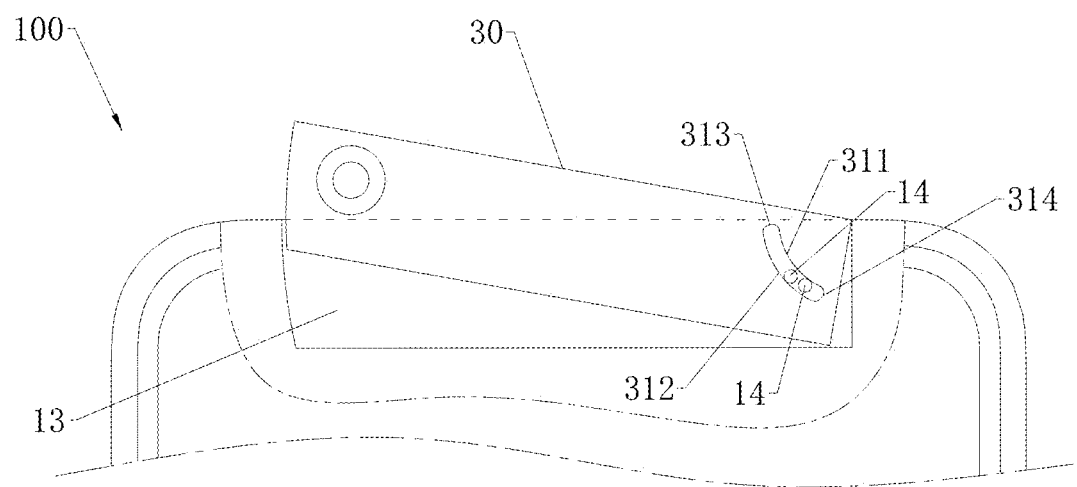
FIG. 3 illustrates a structural diagram of a mobile terminal according to another embodiment of the present disclosure.

As shown in FIG. 3, the number of the slider 14 is two. The outer peripheral surface of one slider 14 abuts against the first groove wall 311. The outer peripheral surface of the other slider 14 abuts against the second groove wall 312. The slider 14 may be, but is not limited to, a cylinder.

When the rotating member 30 is turned out of the recess 13, the two sliders 14 are all rolled from the first end wall 313 toward the second end wall 314. The outer peripheral surface of one slider 14 rolls on the first groove wall 311. The other slider 14 rolls on the second groove wall 312.

When the rotating member 30 is turned into the recess 13, the two sliders 14 are both rolled from the second end wall 314 toward the first end wall 313. The outer peripheral surface of one slider 14 rolls on the first groove wall 311. The other slider 14 rolls on the second groove wall 312.

Furthermore, since the outer circumferential surface of one slider 14 abuts against the first groove wall 311, the outer circumferential surface of the other slider 14 abuts against the second groove wall 312, so that the moving direction of the rotating member 30 is restricted, that is, the slider 14 does not come out of the recess 13 so that the rotating member 30 rotates about the axis of the curved slot 31.

Figure 4:
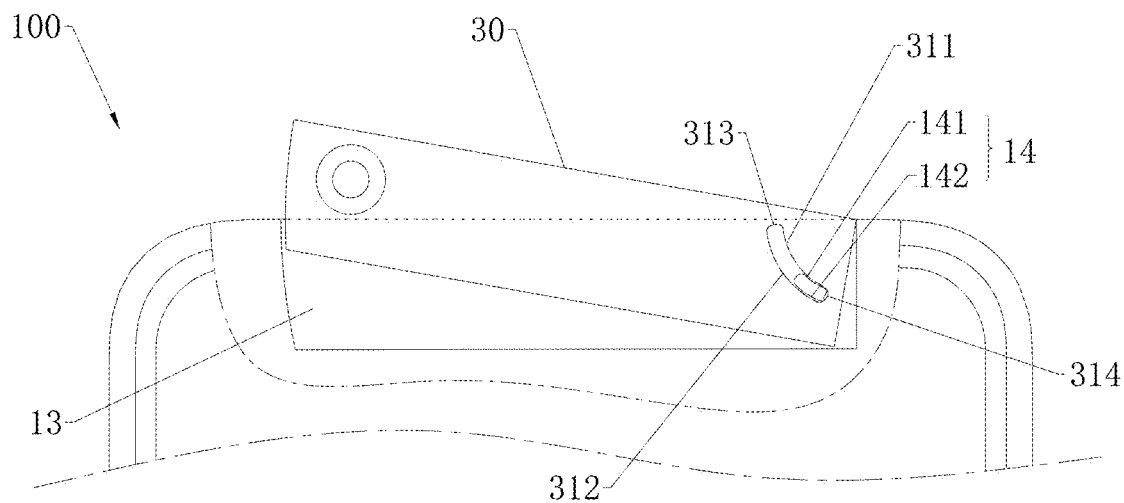
FIG. 4 illustrates a structural diagram of a mobile terminal according to another embodiment of the present disclosure.

As shown in FIG. 4, the slider 14 includes a first sliding curved surface 141 and the second sliding curved surface 142. The axis of the first sliding curved surface 141 coincides with the axis of the central surface and abuts against the first groove wall 311. The axis of the second sliding cam surface 142 coincides with the axis of the center plane and abuts the second groove wall 312.

When the rotating member 30 is positioned in the recess 13, the slider 14 is adjacent to the first end wall 313 or abuts against the first end wall 313. When the rotating member 30 is turned out of the recess 13, the slider 14 is adjacent to the second end wall 314 or abuts against the second end wall 314.

The mobile terminal 100 includes a front surface 11 and a back surface 101 opposite to the front surface 11, the recess 13 is defined between the front surface 11 and the back surface 101.

During the process of the rotating member 30 rotating into the recess 13, the slider 14 moves from the second end wall 314 toward the first end wall 313, and the first sliding curved surface 141 of the first slider 14 slides relative to the first slide groove wall 311, and the second sliding curved surfaces 142 slides relative to the second groove wall 312. An outer peripheral curved surface of the first sliding curved surface 141 abuts against the first channel wall 311, and an outer circumferential surface of the second sliding curved surface 142 abuts against the second groove wall 312, such that the movement direction of the rotating member 30 is restricted. The rotating member 30 is rotated about the axis of the curved slot 31.

Figure 5:
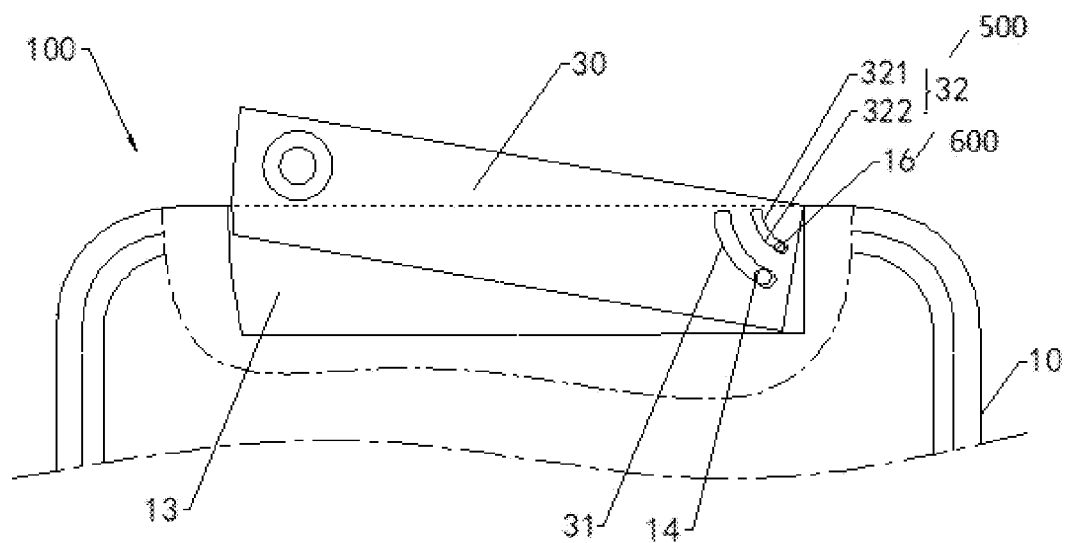
FIG. 5 illustrates a structural diagram of a mobile terminal according to another embodiment of the present disclosure.

As shown in FIG. 5, one of the rotating member 30 and housing 10 is provided with a first auxiliary unit 500, for example, an auxiliary slot 32, and the other is provided with a second auxiliary unit 600, for example, an auxiliary slider 16. It may be understood that when the rotating member 30 is provided with the auxiliary curved slot 32, the housing 10 is provided with the auxiliary slider 16.

When the rotating member 30 is provided with the auxiliary slider 16, the housing 10 is provided with an auxiliary curved slot 32. In the embodiment, the auxiliary curved slot 32 is provided by the rotating member 30, and the auxiliary slider 16 is disposed on the housing 10. The auxiliary slot 32 is spaced apart from the curved slot 31. The axis of the auxiliary slot 32 coincides with the axis of the curved slot 31, and the auxiliary slider 16 is slidably mounted to the auxiliary slot 32. In one embodiment, the auxiliary slot 32 includes a first auxiliary groove wall 321 and a second auxiliary groove wall 322 which are oppositely disposed.

The first auxiliary unit 500 is spaced apart from the first engaging structure 300, the second auxiliary unit 600 is spaced apart from the second engaging structure 400. In one embodiment, the auxiliary slot 32 and the curved slot 31 are arranged coaxially. In one embodiment, the auxiliary slot 32 and the curved slot 31 follows the same curve and a different radius about the axis O.

The axis of the auxiliary center surface of the first auxiliary groove wall 321 and the second auxiliary groove wall 322 is the axis of the auxiliary slot 32. In addition, the auxiliary slot 32 is disposed closer to the axis than the curved slot 31. The size of the center plane of the auxiliary slot 32 is smaller than the size of the center plane of the curved slot 31.

In addition, the auxiliary slider 16 is disposed in the same manner as the slider 14 and will not be described too much herein. Therefore, by providing the auxiliary slot 32 in the rotating member 30, the housing 10 is provided with the auxiliary slider 16 to further ensure that the rotating member 30 does not sway during the rotation, that is, to enhance the stability of the rotating member 30. In other embodiments, the auxiliary slot 32 is disposed away from the axis with respect to the curved slot 31, that is, the size of the center surface of the auxiliary slot 32 is larger than the center surface of the curved slot 31.

Figure 6:
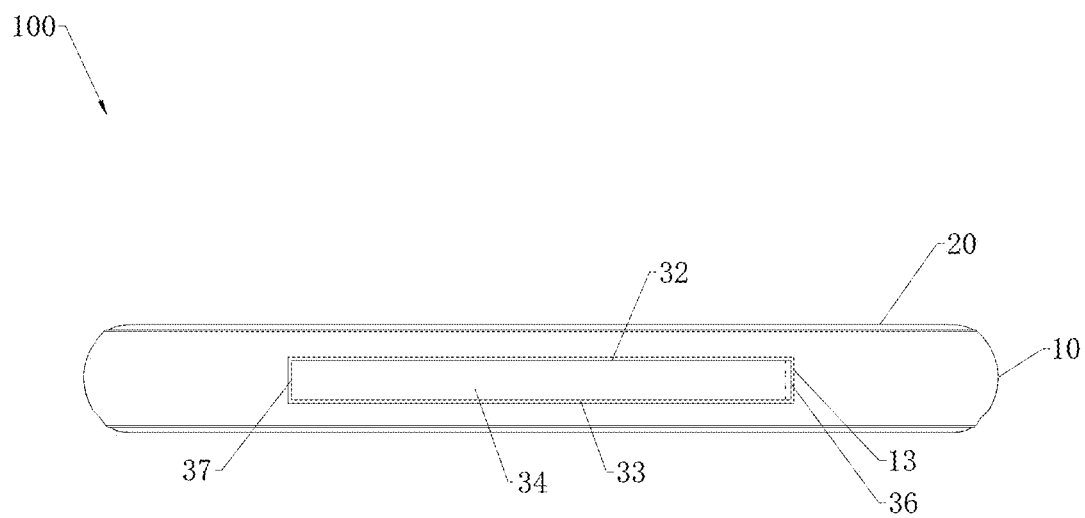
FIG. 6 illustrates a structural view of the mobile terminal shown in FIG. 1 in another perspective.

In one embodiment, as shown in FIG. 2 and FIG. 6, the rotating member 30 includes a first side wall 38, a second side wall 33, a third side wall 34, a fourth side wall 35, a fifth side wall 36 and a sixth side wall 37. The first side wall 38 is disposed toward the display screen 20. The second side wall 33 is disposed opposite to the first side wall 38. The third side wall 34 and the fourth side wall 35 are opposite and both connect the first side wall 38 and second side wall 33 therebetween. The fourth side wall 35 is disposed toward the inside of the housing 10. The fifth side wall 36 and the sixth side wall 37 are opposite and both connect the first side wall 38 and the second side wall 33 therebetween, and the third side wall 34 and the fourth side wall 35 therebetween.

The axis of the curved slot 31 is located at the junction of the third side wall 34 and the fifth side wall 36, or, the axis of the curved slot 31 is located at the junction of the third side wall 34 and the sixth side wall 37, or, the axis of the curved slot 31 is located at the junction of the fourth side wall 35 and the fifth side wall 36, or, the axis of the curved slot 31 is located at the junction of the fourth side wall 35 and the sixth side wall 37.

In the present disclosure, when the two side walls directly intersect with each other, the junction is defined as the junction of the two side walls and the area within a small area around them. When the two side walls are connected by a curved surface, a small rounding or a small chamfering transition, the junction is defined as the junction line formed by the junction of the extending surfaces of the two side walls and the area within a small area around it.

In the present disclosure, the junction of A and B includes a region away from the junction line less than 0.5 mm. For example, as shown in FIG. 2, the junction of the third side wall 34 and the first six side wall 37 includes a region away from the junction line less than 0.5 mm, like the A area shown in FIG. 2.

When the third side wall 34 and the sixth side wall 37 directly intersect, the junction line is the connection position of the third side wall 34 and the sixth side wall 37. FIG. 2 is a front view of the mobile terminal 100 such that the junction line is a junction point. When the third side wall 34 and the sixth side wall 37 are transitioned through the curved surface, the junction line is the third side wall 34 and the connection position at which the sixth side wall 37 extends. Alternatively, when the junction is less than 0.2 mm away from the junction line of the third side wall 34 and the sixth side wall 37, the rotating member 30 may be tightly close to the recess 13, thereby reducing a slot width of a surface of the mobile terminal 100.

The axis O is defined at any one of the junctions formed by the front surface 11, the back surface 101, a first side surface 12, a second side surface 15, a third side surface 16 and a fourth side surface 17.

In one embodiment, the third side wall 34 is substantially parallel to the fourth side wall 35. In other embodiments, the third side wall 34 may also form an angle of less than 15° with the fifth side wall 35.

In this embodiment, the recess 13 has a plurality of ways of setting.

In one embodiment, referring again to FIG. 2, the housing 10 includes a second side surface 15 and a third side surface 16 disposed opposite to the second side surface 15. The first side surface 12 and the front surface 11 are connected between the second side surface 15 and third side surface 16. The first side surface 12 shown in FIG. 2 is located on the top surface of the housing 10, while the first side surface 12 may also be located on the side of the housing 10. Specifically, the following embodiments and the drawings may be embodied. The recess 13 is spaced apart from the second side surface 15 and the third side surface 16, that is, the recess 13 does not extend through the second side surface 15, or say the third side surface 16 or the recess 13 has only one opening, the opening is located on the first side 12. When the rotating member 30 is turned into the recess 13, the fifth side wall 36 is disposed toward the second side surface 15. The sixth side wall 37 is disposed toward the third side surface 16. The axis of the curved slot 31 is at the junction of the third side wall 34 and the fifth side wall 36 or the junction of the third side wall 34 and the sixth side wall 37. It will be appreciated that, the fifth side wall 36 faces toward the second side surface 15 means that the angle between the normal vector of the fifth side wall 36 and the normal vector of the second side surface 15 is an acute angle.

In one embodiment, as in FIG. 1 and FIG. 2, the housing 10 includes a fourth side surface 17 disposed opposite the first side surface 12. The fourth side 17 is connected between the second side surface 15 and the third side surface 16. The distance between the second side surface 15 and the third side surface 16 is less than the distance between the first side surface 12 and the fourth side 17. At this time, the first side surface 12 forms a top surface or a bottom surface of the mobile terminal 100. In the present embodiment, the first side surface 12 being the top surface of the mobile terminal 100 in FIG. 1, that is, the opening of the recess 13 is provided on the top surface of the housing 10. Further, the axis of the curved slot 31 is at the junction of the third side wall 34 and the sixth side wall 37. The camera module 40 is disposed on one end far away from the curved slot 31. The camera module 40 is provided near the side walls 36. When the slider 14 slides from the first end wall 313 to the second end wall of the slide 314, the rotating member 30 rotates relative to housing member 30 about the axis 10 out of the recess 13, at this time, the third side wall 34 and the fifth side wall 36 of the member 30 are at least partially turned out of the recess 13 from the first side surface 12, thereby enabling the image collecting plane 41 of the camera module 40 exposed from the housing 10 for shooting. When the slider 14 slides from the second end wall 314 to the first end 313 of curved slot 31, the rotating member 30 is rotated about the axis relative to the housing member 10 into the recess 13, at this time, the third side wall 34 and the fifth side wall 36 of the rotating member 30 are positioned in the recess 13 so that the image collecting plane 41 of the camera module 40 overlaps the housing 10.

Further, as shown in FIGS. 1 and 2, the fifth side wall 36 is a curved surface. The groove wall 133 of the recess 13 facing the fifth side wall 36 is a curved surface. The shape of the groove wall 133 is the same as that of the fifth side wall 36 so that the rotating member 30 may be smoothly transferred into or out of the recess 13.

Wherein the axis of the fifth side wall 36 and the shape of the groove wall 133 coincides with the axis of the curved slot 31. In one embodiment, a gap may be formed between the fifth side wall 36 and the groove wall 133 of the recess 13. At this time, when the slider 14 slides from the first end wall 313 of the curved slot 31 to the second end wall 314 of the curved slot 31, the fifth side wall 36 slides relative to the groove wall 133 of the recess 13, the groove wall 133 of the recess 13 hardly interferes with the fifth side wall 36, so that the gap width between the fifth side wall 36 and the groove wall 133 of the recess 13 may be a small value. In another embodiment, the fifth side wall 36 and the groove wall 133 of the recess 13 are clearance fit.

Wherein, since the shape of the groove wall 133 and the fifth side wall 36 are both curved surfaces, and the axis coincides with the axis of the curved slot 31, the limiting structure between the groove wall 133 and the fifth side surface 36 may be coupled to the stop structure between the curved slot 31 and the sliders 14 to limit the rotation of the rotating member 30 about the axis of the curved slot 31. It will be understood that this embodiment is also applicable to an arrangement in which the slider 14 is a cylinder.

Further, the third side wall 34 and the sixth side wall 37 are perpendicularly intersected. It will be appreciated that, in the process design and manufacturing process, the error due to the level of technology, the meaning of vertically disposed in the present disclosure is not strictly perpendicular to each other, but the third side wall 34 and the sixth vertical side wall 37 between angle approaching 90°, at this time, the vertical angle between the third side wall 34 and the sixth side wall 37 should be able to be accepted by the skilled in the art, and this angle should not affect the purpose of the implementation. In addition, during the production process, a certain arc surface is formed at the junction of the third side wall 34 and the sixth side wall 37. The arc surface should not affect the purpose of the embodiment of the present disclosure. In addition, when the arc surface exists at the junction of the third side wall 34 and the sixth side wall 37, the third side wall 34 and the sixth side wall 37 are extended to intersect. When the rotating member 30 is turned into the recess 13, The third side wall 34 contacts the sixth side portion 37, thereby avoiding formation of recesses in the exterior surface of the mobile terminal 100 and ensuring the uniformity of the appearance of the mobile terminal 100. Further, when the rotating member 30 is turned into the recess 13, the third side wall 34 is flush with the first side surface 12.

Figure 7:
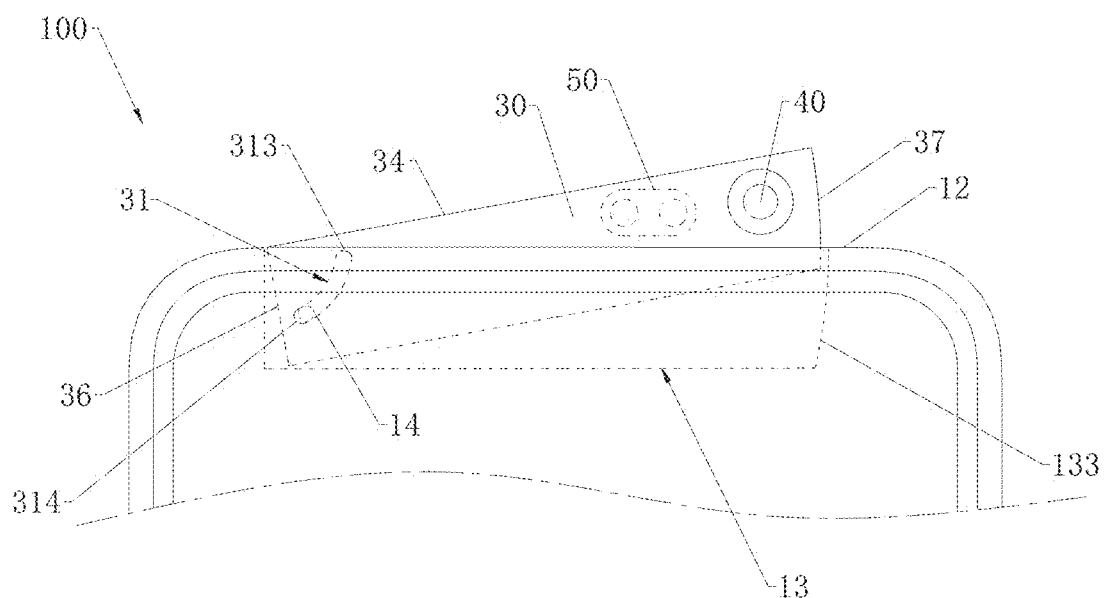
FIG. 7 illustrates a structural diagram of a mobile terminal according to another embodiment of the present disclosure.

In another embodiment, as shown in FIG. 7, the axis of the curved slot 31 is at the junction of the third side wall 34 and the fifth side wall 36, and the camera module 40 is mounted on one end of the rotating member 30 far away from the curved slot 31, that is, the camera module 40 is disposed adjacent to the sixth side wall 37. When the slider 14 slides from the first end wall 313 to the second end wall 314 of the curved slot 31, the rotating member 30 is rotated relative to housing 10 about the axis out of the recess 13, at this time, the third side wall 34 and the sixth side wall 37 of the rotating member 30 are at least partially turned out of the recess 13 from the first side 12, thereby causing the image collecting plane 41 of the camera module 40 to be exposed to the housing 10 for image capture. When the slider 14 slides from the second end wall 314 of the curved slot 31 to the first end 313, the rotating member 30 is rotated about the axis relative to the housing member 10 into the recess 13, at this time, the third side wall 34 and the sixth side wall 37 of the rotating member 30 are positioned in the recess 13 so that the image collecting plane 41 of the camera module 40 overlaps the housing 10.

Further, as shown in FIG. 7, the sixth side wall 37 is a curved surface. The groove wall 133 of the recess 13 facing the sixth side wall 37 is a curved surface. The shape of the groove wall 133 is the same as that of the sixth side wall 37 so that the rotating member 30 may be smoothly transferred into or out of the recess 13.

Wherein the axis of the sixth side wall 37 and the shape of the groove wall 133 coincide with the axis of the curved slot 31. In one embodiment, a gap may be formed between the sixth side wall 37 and the groove wall 133 of the recess 13. At this time, when the slider 14 slides from the first end wall 313 of the curved slot 31 toward the second end wall 314 of the curved slot 31, and the sixth side wall 37 slides relative to the groove wall 133 of the recess 13, the groove wall 133 of the recess 13 hardly interferes with the sixth side wall 37, so that the gap width between the sixth side wall 37 and the groove wall 133 of the recess 13 may be set by a small value. In another embodiment, the sixth side wall 37 and the groove wall 133 of the recess 13 are clearance fit.

The third side wall 34 and the fifth side wall 36 are perpendicularly intersected. When the rotating member 30 is turned into the recess 13, the third side wall 34 contacts the fifth side wall 36, thereby avoiding recesses in the exterior surface of the mobile terminal 100 to ensure the uniformity of the appearance of the mobile terminal 100.

When the rotating member 30 is turned into the recess 13, the third side wall 34 is flush with the first side surface 12.

As shown in FIG. 7, the rotating member 30 further includes at least a camera module, an iris recognition module, a face recognition module, a flash, a microphone, or a photoreceptor. For example, the rotating member 30 is further provided with a camera module 50. The camera module 50 may be used to capture an image of the back of the display screen 20. The camera module 50 may include a plurality of camera modules. The function of each camera module may be different. At this time, when it is necessary to take an image of the back side of the display screen 20, the rotating member 30 carries the camera module out of the recess 13 for shooting. When the shooting is unnecessary, the rotating member 30 carries the camera module into the recess 13 to avoid opening a through hole in the housing 10, thereby ensuring the appearance uniformity of the mobile terminal 100.

Figure 8:
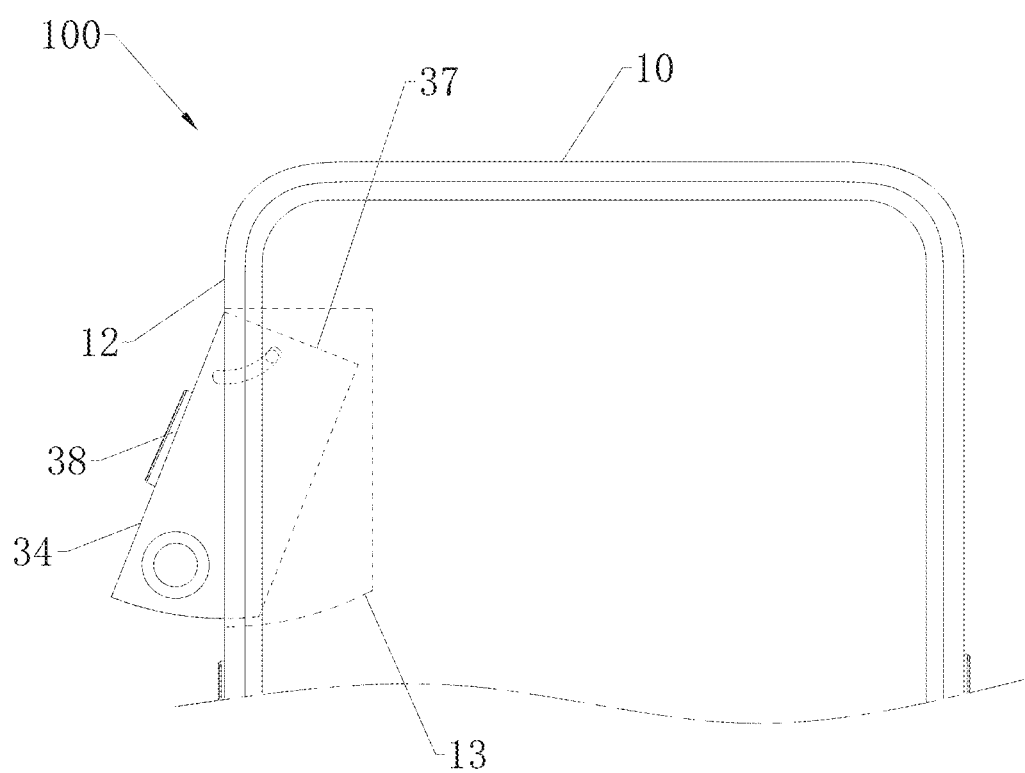
FIG. 8 illustrates a structural diagram of a mobile terminal according to another embodiment of the present disclosure.
Figure 9:
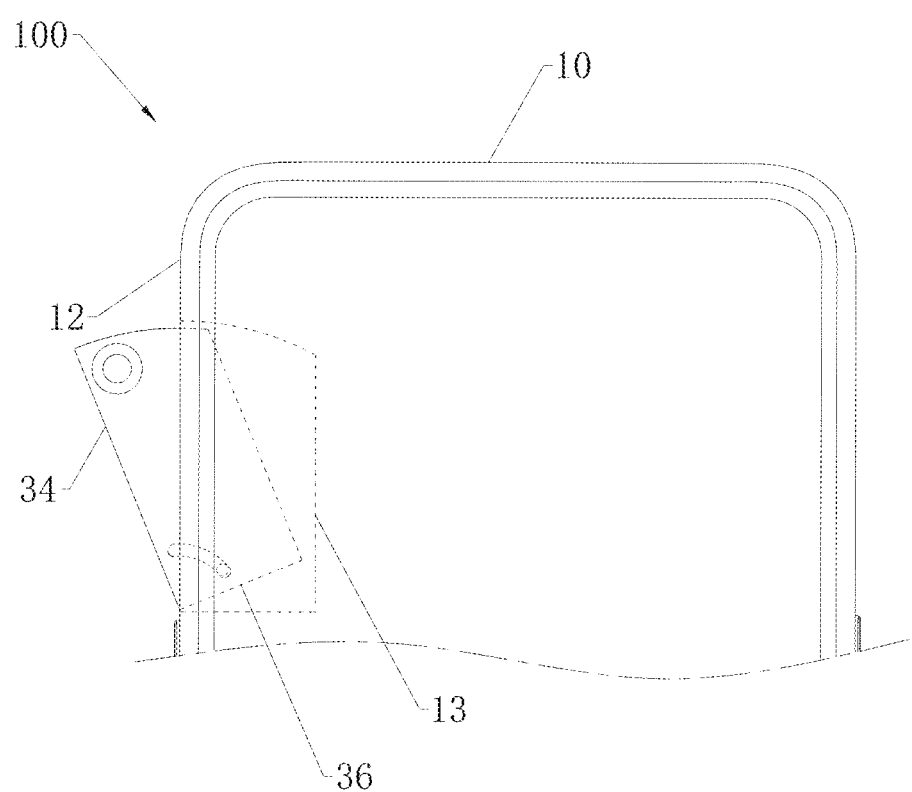
FIG. 9 illustrates a structural diagram of a mobile terminal according to another embodiment of the present disclosure.
Figure 10:
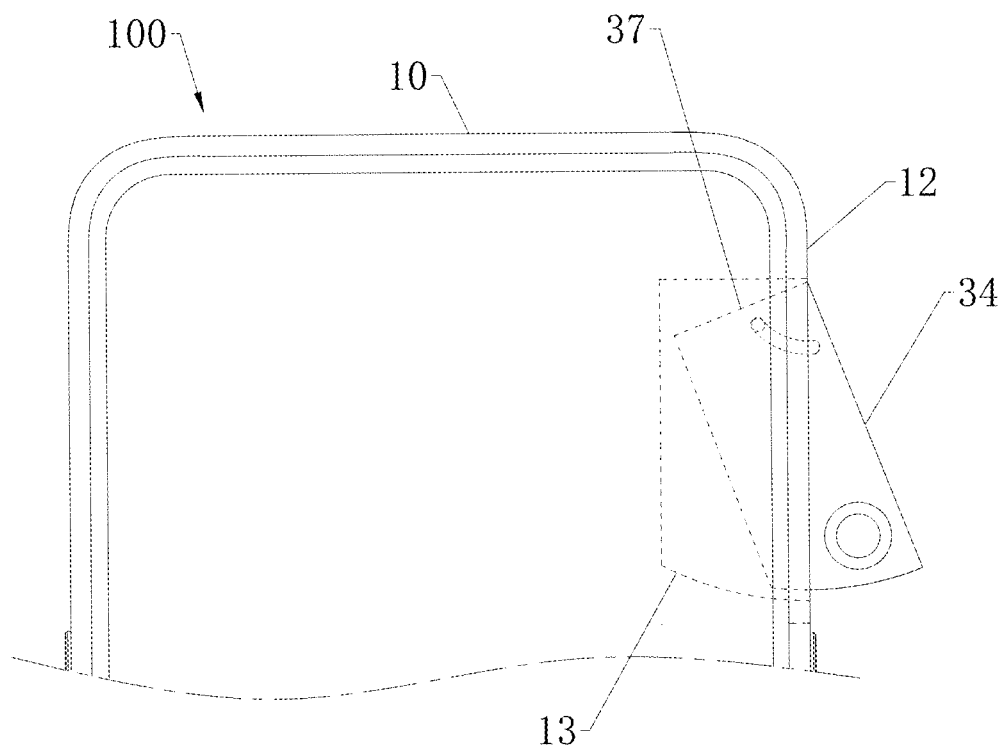
FIG. 10 illustrates a structural diagram of a mobile terminal according to another embodiment of the present disclosure.
Figure 11:
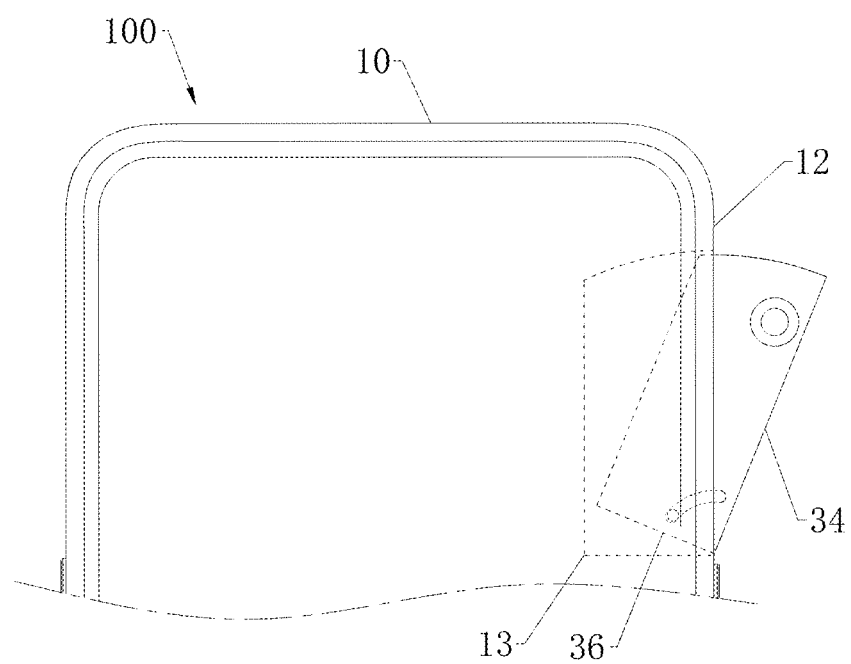
FIG. 11 illustrates a structural diagram of a mobile terminal according to another embodiment of the present disclosure.

In another embodiment, the distance between the second side surface 15 and the third side surface 16 is greater than the distance between the first side surface 12 and fourth side 17. At this time, the first side surface 12 forms a left-side surface or a right-side surface of the mobile terminal 100. Specifically, the specific arrangement of the recess 13 will not be described herein again, with reference to FIGS. 8 to 11. In FIG. 8, the first side surface 12 is the left side surface of the housing 10, and the axis of the curved slot 31 is located at the junction of the third side wall 34 and the sixth side wall 37. In FIG. 9, the first side surface 12 is the left side surface of the housing 10, and the axis of the curved slot 31 is located at the junction of the third side wall 34 and the first five side walls 36. In FIG. 10, the first side surface 12 is the right side of the housing 10, and the axis of the curved slot 31 is located at the junction of the third side wall 34 and the sixth side wall 37. In FIG. 11, the first side surface 12 is the right side of the housing 10, and the axis of the curved slot 31 is located at the junction of the third side wall 34 and the fifth side wall 36.

As shown in FIG. 8, the rotating member 30 is further provided with a button 38. When it is necessary to take an image, the rotating member 30 carries the camera module 40 from the left side of the mobile terminal 100 to out of the recess 13 for shooting. At this time, the button 38 also rotates out of the recess 13 from the left side with the rotating member 30. The button 38 may be used to turn the switch of the mobile terminal 100 on or off. Of course, the button 38 may also be used as a brightness adjustment switch for capturing an image. When it is desired to increase the brightness of the image, the rotating member 30 is turned out of the recess 13 so that the button 38 rotates out of the recess 13 with the rotating member 30. Therefore, by providing a button 38 on the rotating member 30, it is possible to avoid additionally providing a through hole on the mobile terminal 100 for mounting the button 38, thereby making the appearance of the mobile terminal 100 more uniform, that is, ensuring the appearance consistency of the mobile terminal 100.

Figure 12:
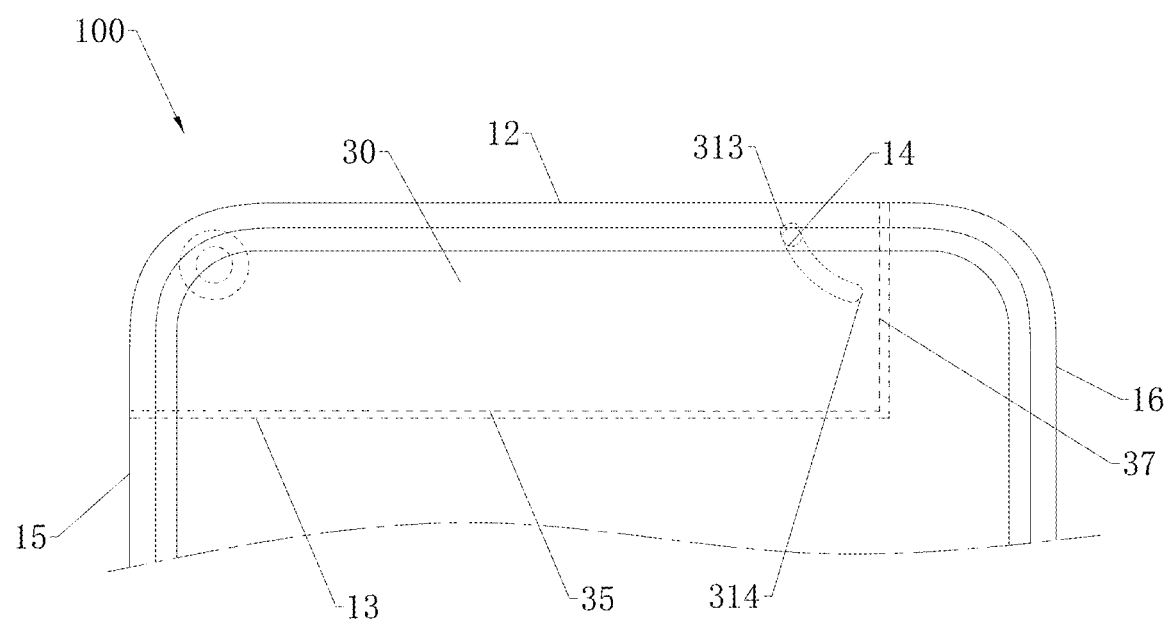
FIG. 12 illustrates a structural diagram of a mobile terminal according to another embodiment of the present disclosure.
Figure 13:
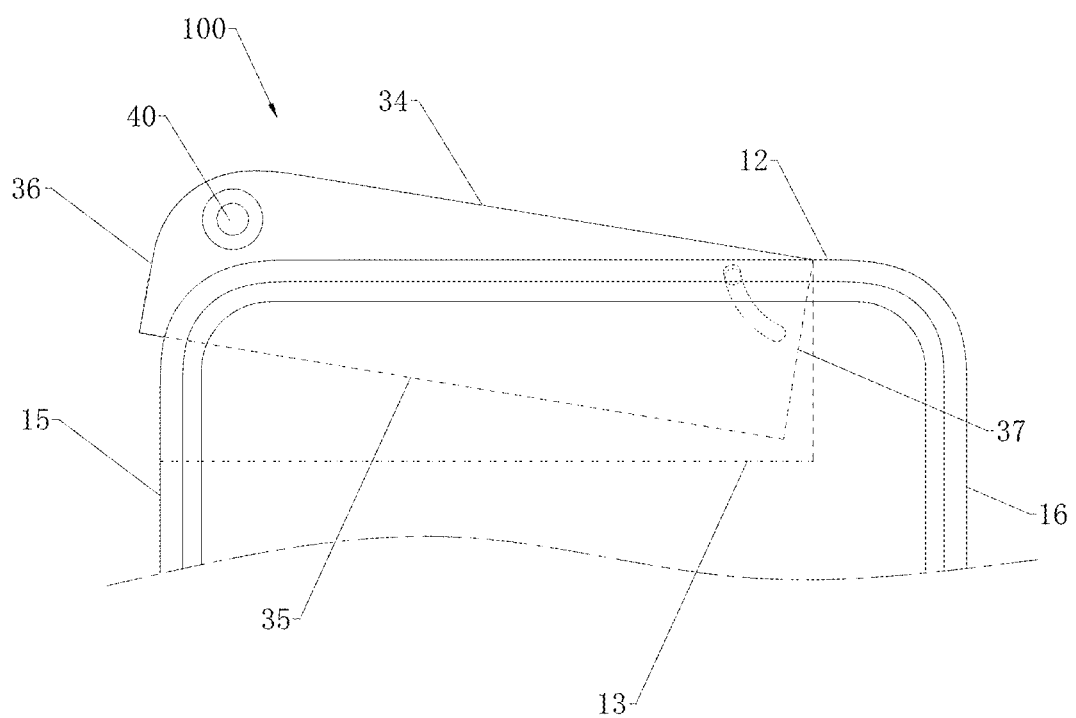
FIG. 13 illustrates a structural diagram of the mobile terminal shown in FIG. 12 in another use state.

In another embodiment, as shown in FIG. 12 and FIG. 13, the recess 13 extends to the second side surface 15, and the recess 13 and the third side surface 16 are spaced apart from each other, that is, the recess 13 includes another opening formed in the second side surface 15. The first side surface 12 shown in FIG. 12 is located on the top surface of the housing 10, and the first side surface 12 may also be located on the left or right side of the housing 10. When the rotating member 30 is turned into the recess 13, the fifth side wall 36 is disposed toward the second side surface 15, and the sixth side wall 37 is disposed toward the third side surface 16. The axis of the curved slot 31 is at the junction of the third side wall 34 and the fifth side wall 36, or the axis of the curved slot 31 is located at the junction of the third side wall 34 and the sixth side wall 37, or, the axis of the curved slot 31 is located at the junction of the fourth side wall 35 and the fifth side wall 36.

In one embodiment, please referring to FIGS. 12 and 13 again, the first side surface 12 is the top surface of the housing 10, that is, an opening of the recess 13 is located on the top surface of the housing 10. In the present embodiment, the second side surface 15 is taken as an example of the left side surface of the housing 10. Further, the axis of the curved slot 31 is located at the junction of the third side wall 34 and the six side wall 37, and the camera module 40 is disposed at one end far away from the curved slot 31, that is, the camera module 40 is disposed near the fifth side wall 36. When the slider 14 slides from the first end wall 313 to the second end wall 314, the rotating member 30 rotates about the axis relative to housing member 10 out of the recess 13, at this time, at least part of the third side wall 34 of the rotating member 30 emerges from a first side surface 12 out of the recess 13, at least a part of the fifth side wall 36 emerges from the second side surface 15, so that the image collecting plane 41 of the camera module 40 image is exposed from the housing 10 for shooting. When the slider 14 slides from the second end wall 314 of the curved slot 31 to the first end wall 313, the rotating member 30 is rotated about the axis relative to the housing member 10 into the recess 13, at this time, the third side wall 34 and the five side wall 36 of the rotating member 30 are accommodated in the recess 13.

The third side wall 34 is disposed perpendicular to the sixth side wall 37. When the rotating member 30 is turned into the recess 13, the third side wall 34 contacts the sixth side wall 37, thereby avoiding a formation of a recess on the exterior surface of the mobile terminal 100 to ensure the appearance uniformity of the mobile terminal 100. Further, when the rotating member 30 is turned into the recess 13, the third side wall 34 is flush with the first side surface 12.

Referring to FIGS. 12 and 13, when the rotating member 30 rotates into the recess 13, the third side wall 34 and the first side surface 12 is flush, that is, the third side wall 34 and the first side surface 12 are in the same plane. The fifth side wall 36 is flush with the second side surface 15, that is, the fifth side wall 36 and the second side surface 15 are in the same plane. The label of the third side wall 34 and the fifth side wall 36 are omitted in FIG. 12 and labeled in FIG. 13. The junction of the third side wall 34 and the fifth side wall 36 has a curved transition, and a thick line in FIG. 13 indicates a curved surface. In this case, the third side wall 34 of the rotating member 30 and the housing 10 forms the appearance surface of the mobile terminal 100. The fifth side wall 36 and the second side surface 15 forms a left side surface of the mobile terminal 100. Therefore, when the third side wall 34 and the fifth side wall 36 forms an arc transition at the junction of therebetween, there is no angle formed in the junction of the third side wall 34 and the fifth side wall 36 to avoid lowering the user experience.

Figure 14:
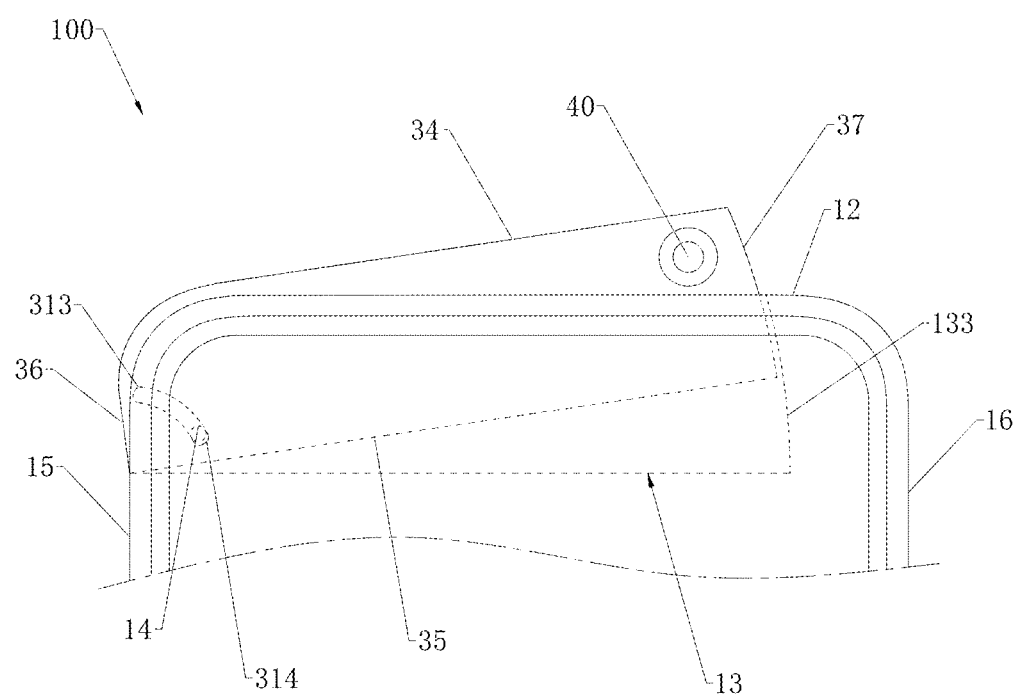
FIG. 14 illustrates a structural diagram of a mobile terminal according to another embodiment of the present disclosure.

In another embodiment, as shown in FIG. 14, the axis of the curved slot 31 is at the junction of the fourth side wall 35 and the fifth side wall 36. When the slider 14 slides from the first end wall 313 to the second end wall 314, the rotating member 30 rotates about the axis relative to the housing 10 out of the recess 13, at this time, at least a part of the third side wall 34 and the sixth side wall 37 rotates from the first side surface 12 out of the recess 13, and at least a part of the fifth side wall 36 rotates from the second side surface 15 out of the recess 13, so that the image collecting plane 41 exposes from the housing 10 for taking image capture.

As shown in FIG. 14, the sixth side wall 37 is a curved surface. The groove wall 133 of the recess 13 facing the sixth side wall 37 is a curved surface. The shape of the groove wall 133 is the same as that of the sixth side wall 37 so that the rotating member 30 may be smoothly transferred into or out of the recess 13.

The axis of the sixth side wall 37 and the shape of the groove wall 133 coincide with the axis of the curved slot 31. In one embodiment, a gap may be formed between the sixth side wall 37 and the groove wall 133 of the recess 13. At this time, when the slider 14 slides from the first end wall 313 of the curved slot 31 toward the second end wall 314 of the curved slot 31, and the sixth side wall 37 slides relative to the groove wall 133 of the recess 13, the groove wall 133 of the recess 13 hardly interferes with the sixth side wall 37, so that the gap width between the sixth side wall 37 and the groove wall 133 of the recess 13 may be set to a small value. In another embodiment, the sixth side wall 37 and the groove wall 133 of the recess 13 are clearance fit.

Figure 15:
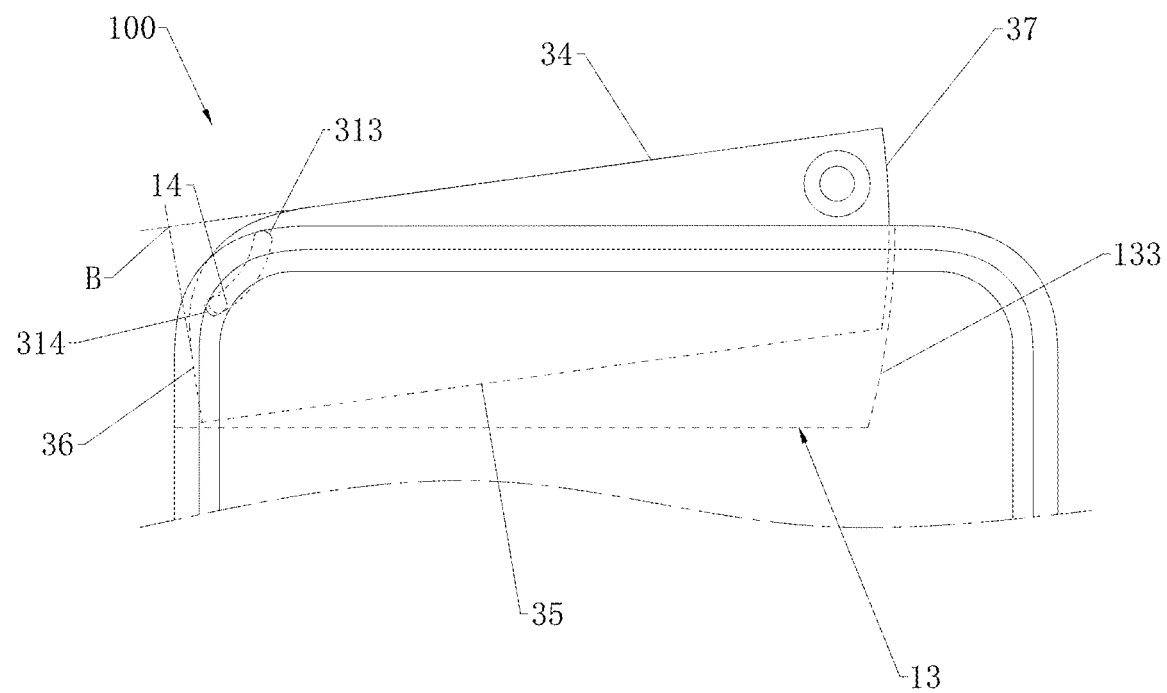
FIG. 15 illustrates a structural diagram of a mobile terminal according to another embodiment of the present disclosure.

In another embodiment, as shown in FIG. 15, the axis of the curved slot 31 is located at the junction of the third side wall 34 and the first five side walls 36. Since the third side wall 34 and the fifth side wall 36 are arcuate transition, the junction of the third side wall 34 and the fifth side wall 36 is the extension position of the third side wall 34 and the fifth side wall 36. That is, the point B of FIG. 15. When the slider 14 slides from the first end wall 313 to the second end wall 314, the rotating member 30 relative to the housing 10 about the axis out of the recess 13, at this time, at least part of the third side wall 34 of the rotating member 30 and the sixth side wall 37 may rotate from the first side surface 12 out of the recess 13, so that the image collecting plane 41 of the camera module 40 may emerge from the housing 10 for imaging.

As shown in FIG. 15, the sixth side wall 37 is a curved surface. The groove wall 133 of the recess 13 facing the sixth side wall 37 is a curved surface. The shape of the groove wall 133 is the same as that of the sixth side wall 37 so that the rotating member 30 may be smoothly rotated into or out of the recess 13.

The axis of the sixth side wall 37 and the shape of the groove wall 133 coincide with the axis of the curved slot 31. In one embodiment, a gap may be formed between the sixth side wall 37 and the groove wall 133 of the recess 13. At this time, when the slider 14 slides from the first end wall 313 of the curved slot 31 toward the second end wall 314 of the curved slot 31, and the sixth side wall 37 slides relative to the groove wall 133 of the recess 13, the groove wall 133 of the recess 13 hardly interferes with the sixth side wall 37, so that the gap width between the sixth side wall 37 and the groove wall 133 of the recess 13 may be set to a small value. In another embodiment, the sixth side wall 37 and the groove wall 133 of the recess 13 are clearance fit.

Figure 16:
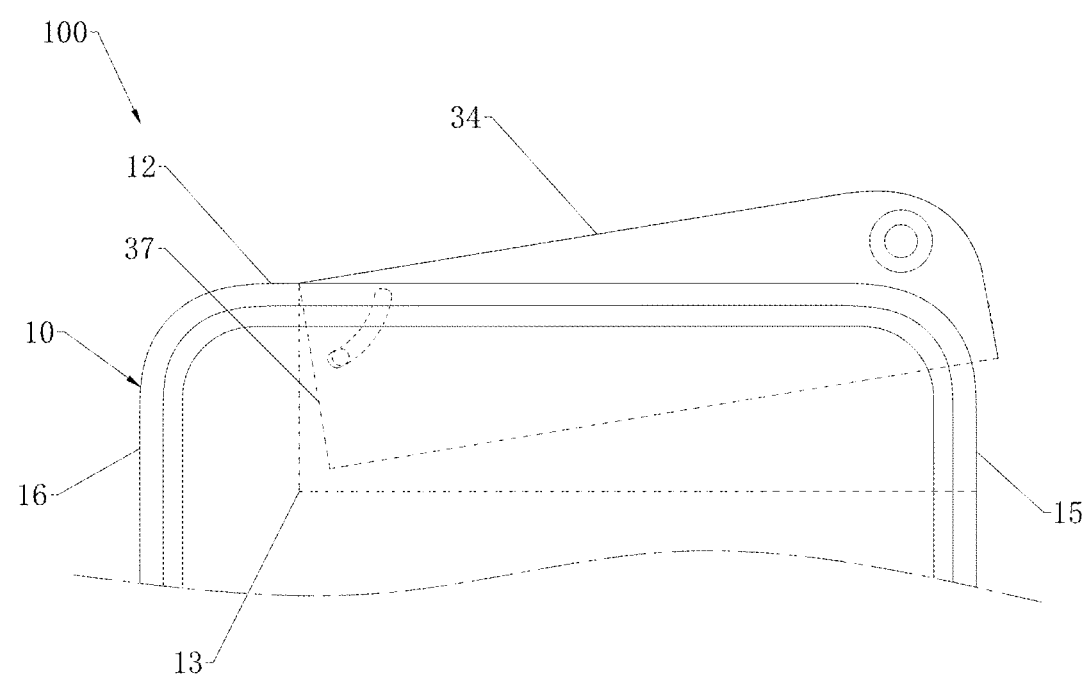
FIG. 16 illustrates a structural diagram of a mobile terminal according to another embodiment of the present disclosure.
Figure 17:
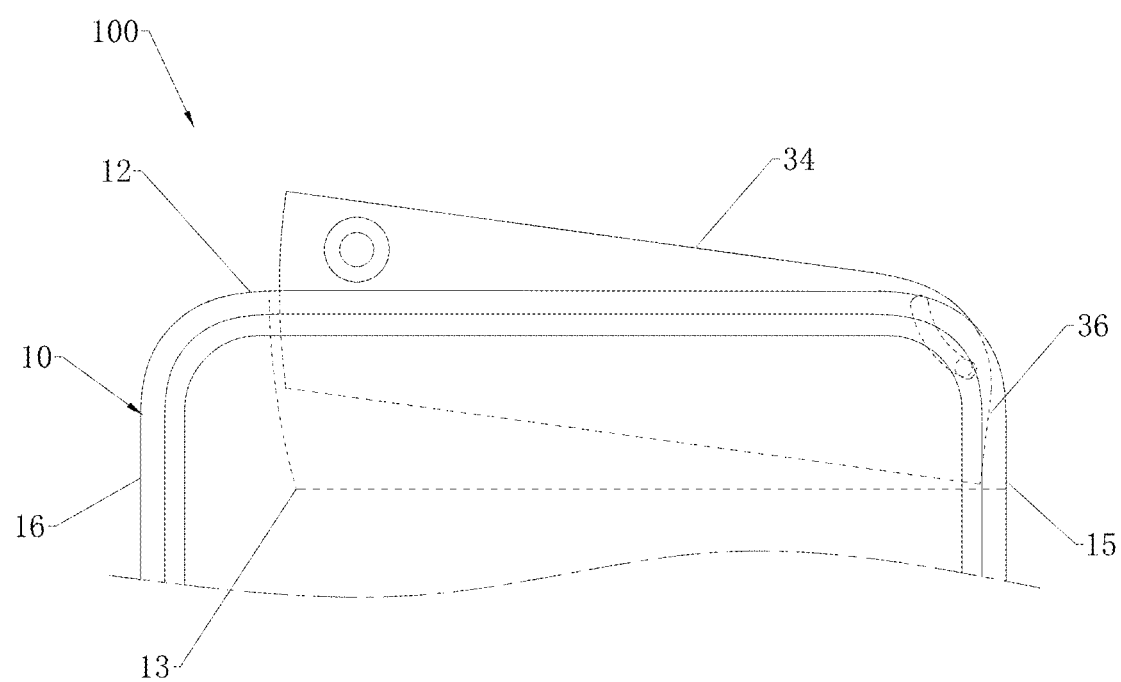
FIG. 17 illustrates a structural diagram of a mobile terminal according to another embodiment of the present disclosure.
Figure 18:
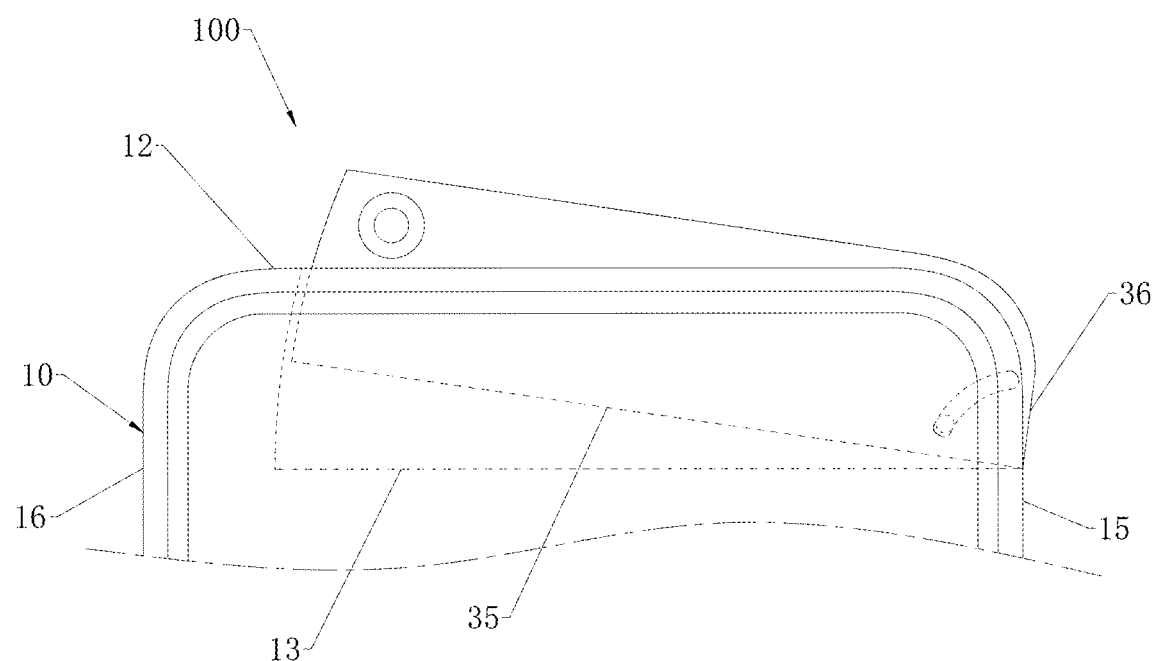
FIG. 18 illustrates a structural diagram of a mobile terminal according to another embodiment of the present disclosure.
Figure 19:
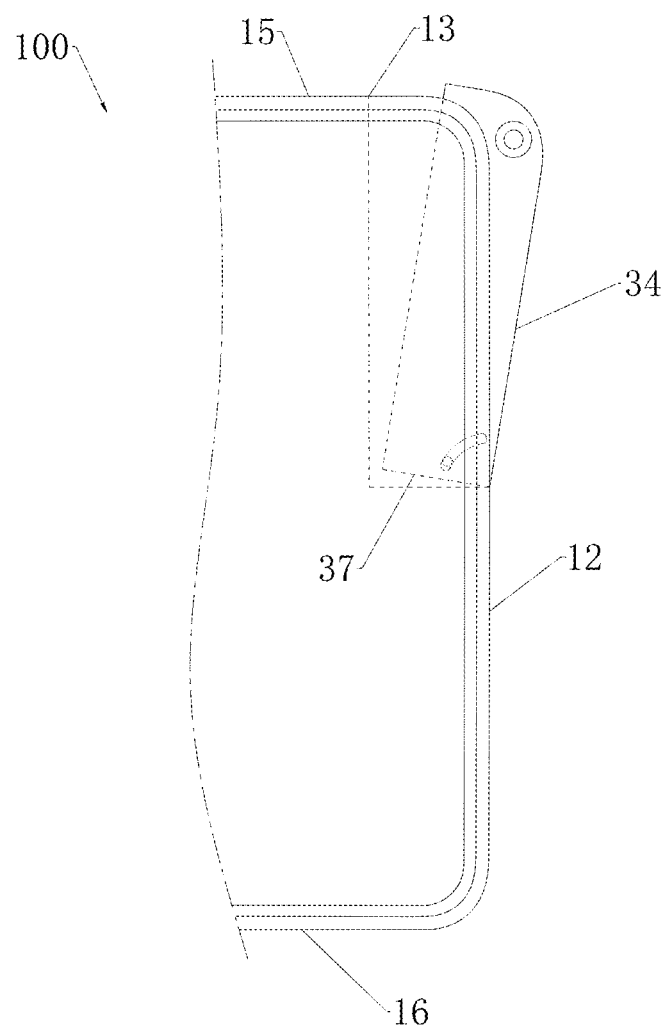
FIG. 19 illustrates a structural diagram of a mobile terminal according to another embodiment of the present disclosure.
Figure 20:
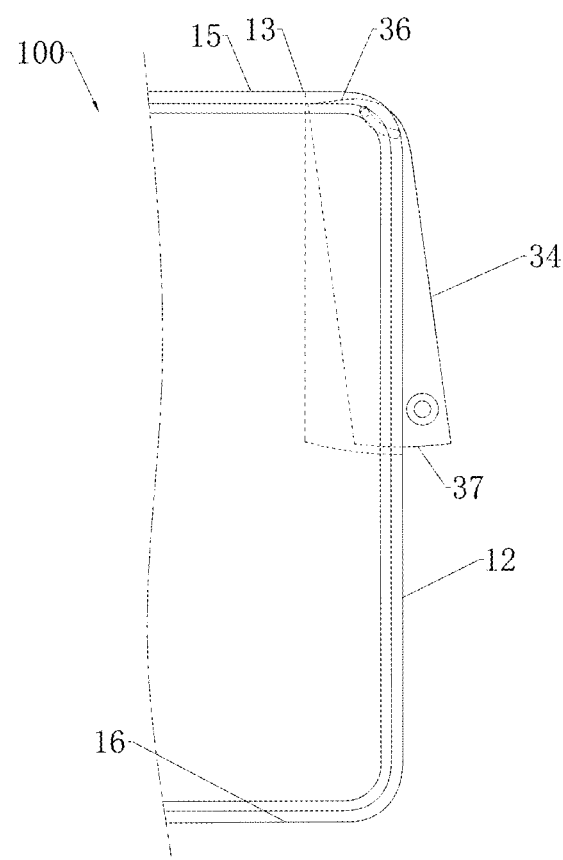
FIG. 20 illustrates a structural diagram of a mobile terminal according to another embodiment of the present disclosure.
Figure 21:
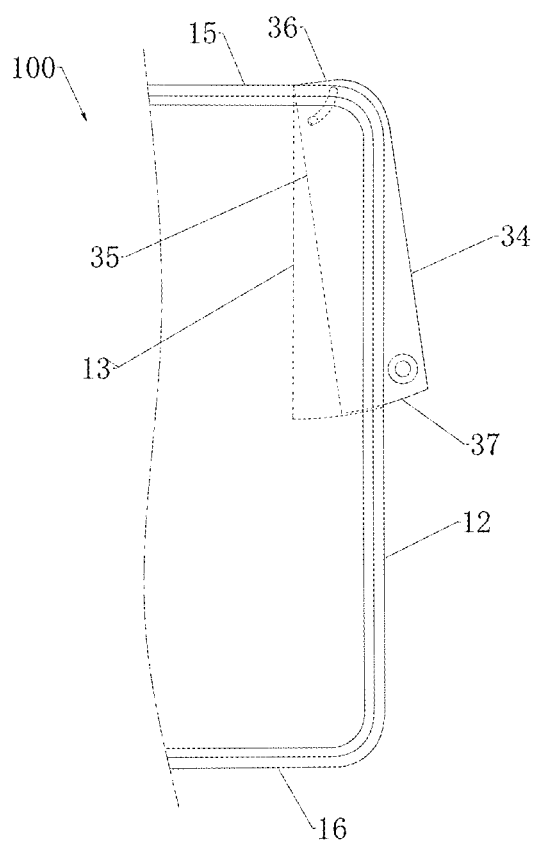
FIG. 21 illustrates a structural diagram of a mobile terminal according to another embodiment of the present disclosure.
Figure 22:
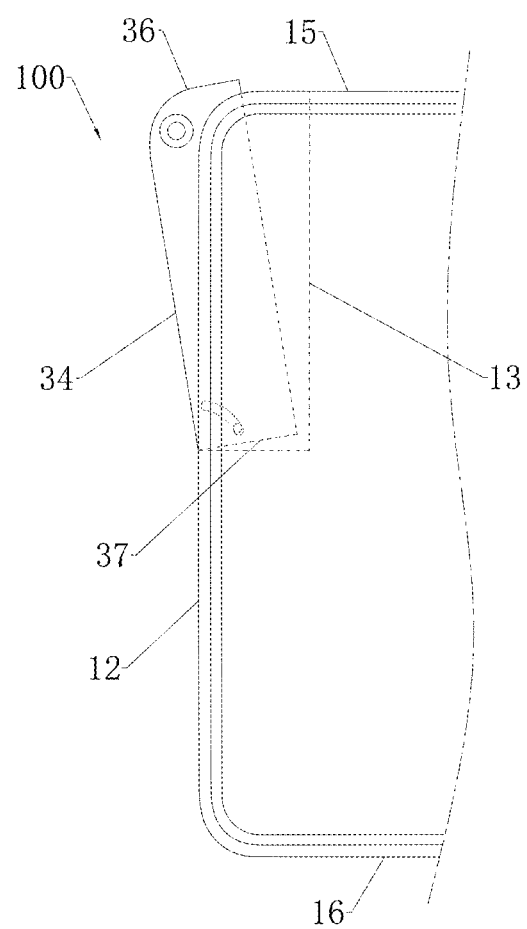
FIG. 22 illustrates a structural diagram of a mobile terminal according to another embodiment of the present disclosure.

In other embodiments, the second side surface 15 may also be the right side surface of the housing 10, and the second side surface 15 may also be the left side surface of the housing 10. At this time, the arrangement of the recess 13 may be referred to FIGS. 16 to 18 and will not be described in detail herein. FIG. 16 shows that the axis of the curved slot 31 is in the junction of the third side wall 34 and the sixth side wall 37. FIG. 17 shows that the axis of curved slot 31 is located in the junction of the first three side walls 34 and the fifth side wall 36. FIG. 18 shows that the axis of the curved slot 31 is in the junction of the fourth side wall 35 and the fifth side wall 36. Further, the first side surface 12 may also be the left side surface or the right side surface of the mobile terminal 100. At this time, the second side surface 15 may be a top surface or a bottom surface of the mobile terminal 100, with reference to FIGS. 19 to 22. The recess 13 is not described here, please referring to the above-mentioned description. FIG. 19 shows the axis of the curved slot 31 is in the junction of the third side wall 34 and the sixth side wall 37. FIG. 20 shows that the axis of the curved slot 31 is in the junction of the third side wall 34 and the fifth side wall 36. FIG. 21 shows that the axis of the curved slot 31 is in the junction of the fourth side wall 35 and the fifth side wall 36. FIG. 22 shows that the first side surface 12 is in the left side of the housing 10, and the axis of the curved slot 31 is in the junction of the third side wall 34 and the sixth side wall 37. Of course, when the first side surface 12 is located on the left side surface of the housing 10, the axis of the curved slot 31 has other forms, which are not listed here, and may be referred to FIG. 20 and FIG. 21.

The following is a third embodiment. The difference between the third embodiment and the second embodiment is that the first side surface 12 is located on the side of the housing 10.

The recess 13 extends to the second side surface 15 and the third side surface 16. The recess 13 includes a first opening, a second opening, and a third opening. The first opening is disposed on the first side surface 12 and the second opening is disposed on the second side surface 15. The third opening is disposed on the third side surface 16.

When the rotating member 30 rotates into the recess 13, the fifth side wall 36 faces toward the second side surface 15, the sixth side wall 37 faces toward the third side surface 16. The axis of the curved slot 31 is located at the junction of the fifth side wall 36 and the third side wall 34, the junction of the third side wall 34 and the sixth side wall 37, the junction of the fourth side wall 35 and the fifth side wall 36, or the junction of the fourth side wall 35 and the sixth side wall 37.

Figure 24:
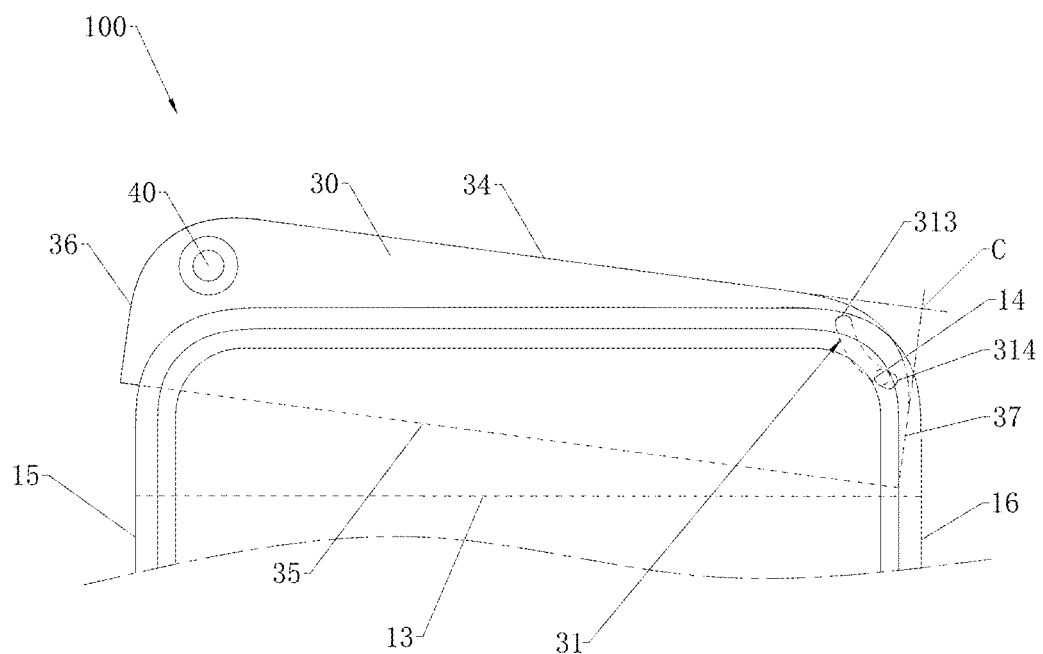
FIG. 24 illustrates a structural diagram of the mobile terminal shown in FIG. 23 in another use state.

In one embodiment, as shown in FIG. 24, the first side surface 12 is the top surface of the housing 10. The first opening of the recess 13 is provided on the top surface of the housing 10.

Furthermore, the second side surface 15 may be the left side surface of the housing 10, the third side surface 16 is the right side surface of the housing 10, or the second side surface 15 is the right side surface of the housing 10, and the third side surface 16 is a left side surface of the housing 10.

Figure 23:
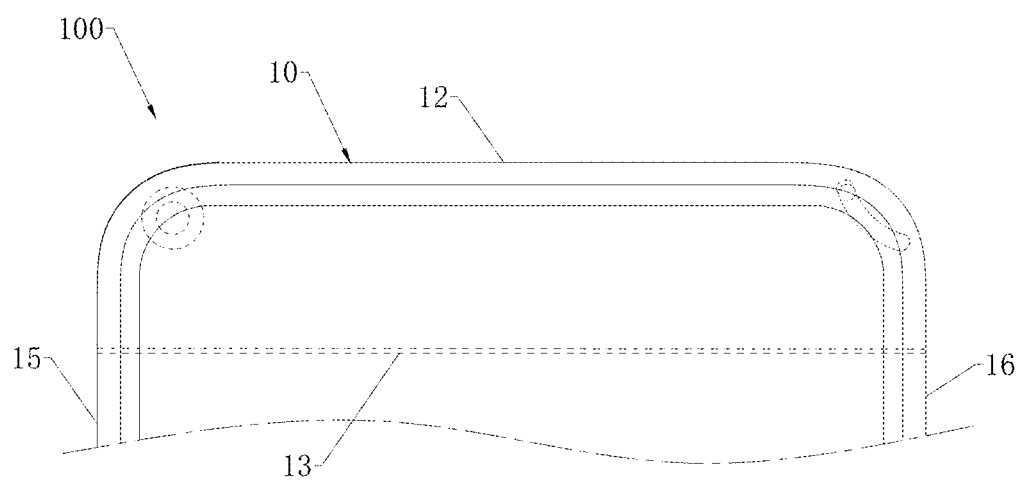
FIG. 23 illustrates a structural diagram of a mobile terminal according to another embodiment of the present disclosure.

In the present embodiment, the second side surface 15 is the left side surface of the housing 10, and the third side surface 16 is the right side surface of the housing 10. When the axis of the curved slot 31 is in the junction of the third side wall 34 and the sixth side wall 37, and the camera module 40 is mounted on the end far away from the curved slot 31 of the rotating member 30. The camera module 40 is disposed near the fifth side walls 36. Since the third side wall 34 and the sixth side wall 37 are through a curved surface transition, at this time, the intersection of the third side wall 34 and the sixth side wall 37 is located on the extending portion of the third side wall 34 and the sixth side wall 37, that is, point C in FIG. 23.

When the slider 14 slides from the first end wall to the second end wall 314, the rotating member 30 rotates relative to the housing 10 about the axis out of the recess 13, at this time, at least part of the third side wall 34 of the rotating member 30 rotates from the first side surface 12 out of the recess 13, and at least part of the fifth side wall 37 of the rotating member 30 rotates from the second side surface 15 out of the recess 13 to expose the image collecting plane 41 of the camera module 40 for imaging.

As shown in FIG. 24, when the rotating member 30 is rotated into the recess 13, the third side wall 34 is flush with the first side surface 12, that is, the third side wall 34 is in the same plane as the first side surface 12, and the fifth side wall 36 is flush with the second side surface 15, that is, the fifth side wall 36 and the second side surface 15 are in the same plane, and the sixth side wall 37 is flush with the third side surface 16, that is, the sixth side wall 37 and the third side surface 16 are in the same plane. The junction of the third side wall 34 and the sixth side wall 37 has a curved transition, and the arc is indicated by a thick line in FIG. 23.

The third side wall 34 of the rotating member 30 and the first side surface 12 form a top surface of the mobile terminal 100, and the fifth side wall 36 and the second side surface 15 form a left side surface and a sixth side wall 37, and the third side surface 16 form a right side of the mobile terminal 100. Therefore, when the third side wall 34 and the sixth side wall 37 forms an arc transition at the junction of therebetween, there is no angle formed in the junction of the third side wall 34 and the sixth side wall 37 to avoid lowering the user experience.

Figure 25:
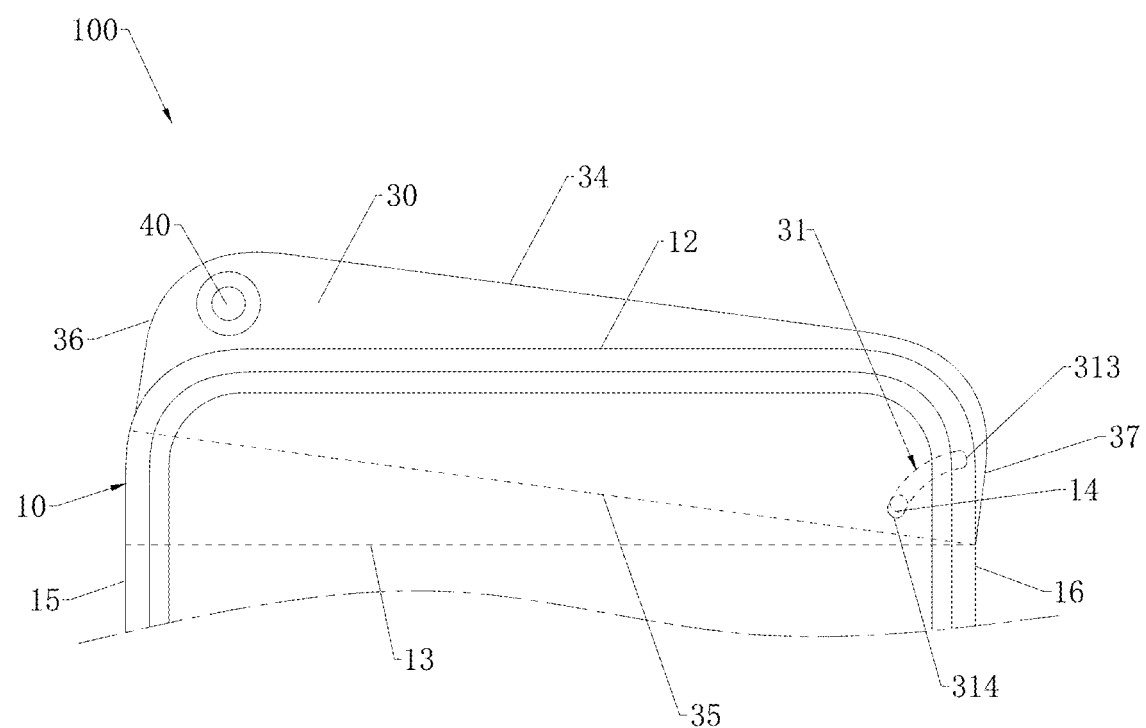
FIG. 25 illustrates a structural diagram of a mobile terminal according to another embodiment of the present disclosure.

In another embodiment, as shown in FIG. 25, the axis of the curved slot 31 is at the junction of the fourth side wall 35 and the sixth side wall 37. When the slider 14 slides from the first end wall 313 to the second end wall 314, the rotating member 30 rotates about the axis relative to the housing 10 out of the recess 13, at this time, at least a part of the third side wall 34 rotates from the first side surface 12 out of the recess 13, and at least a part of the fifth side wall 36 rotates from the second side surface 15 out of the recess 13, and at least a part of the sixth side wall 36 rotates from third side surface 16 out of the recess 13 so that the image collecting plane 41 exposes from the housing 10 for taking image capture.

Figure 26:
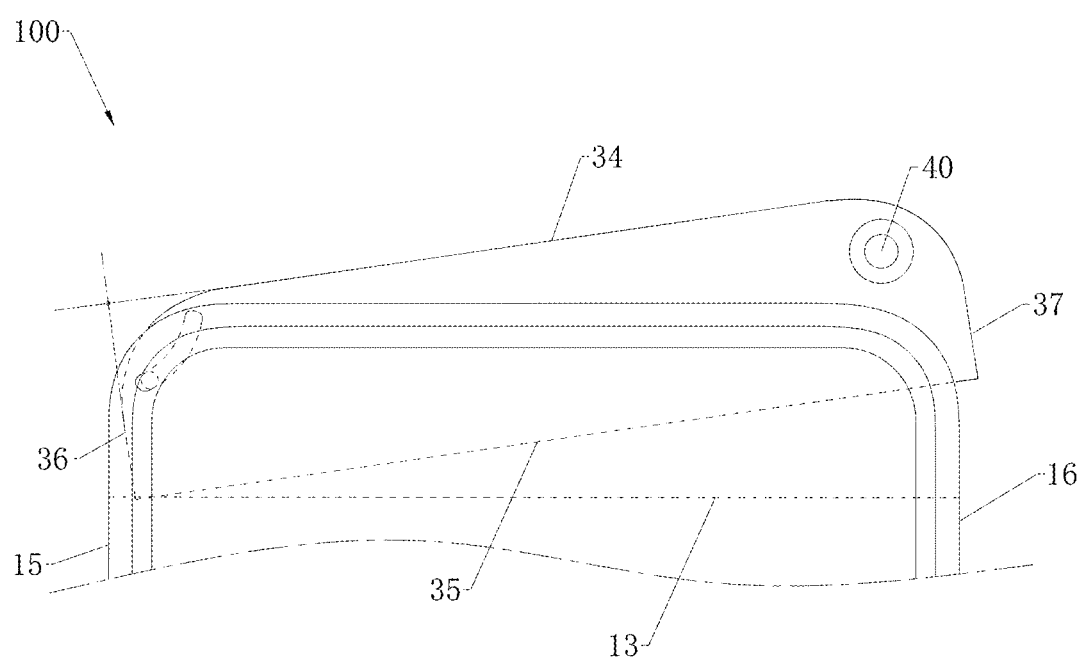
FIG. 26 illustrates a structural diagram of a mobile terminal according to another embodiment of the present disclosure.
Figure 27:
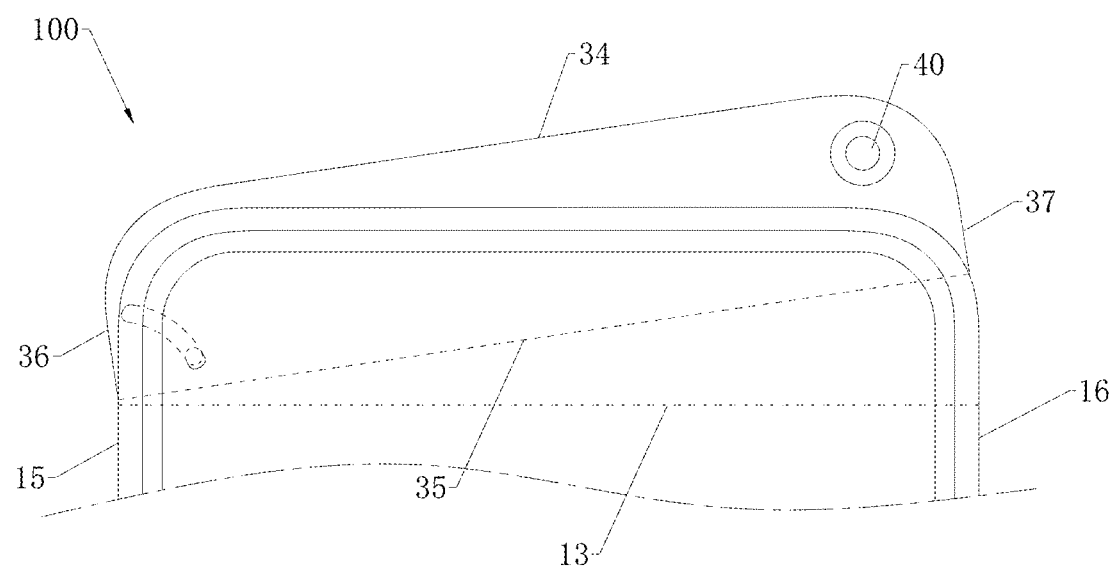
FIG. 27 illustrates a structural diagram of a mobile terminal according to another embodiment of the present disclosure.

In another embodiment, the rotating process of the axis of the curved slot 31 in the junction of the third side wall 34 and the first five side wall 36 is not described here, and the rotating process of the axis of the curved slot 31 in the junction of the fourth side wall 35 and the fifth side wall 36 is not described here, which are shown in the FIG. 26 and FIG. 27.

Figure 28:
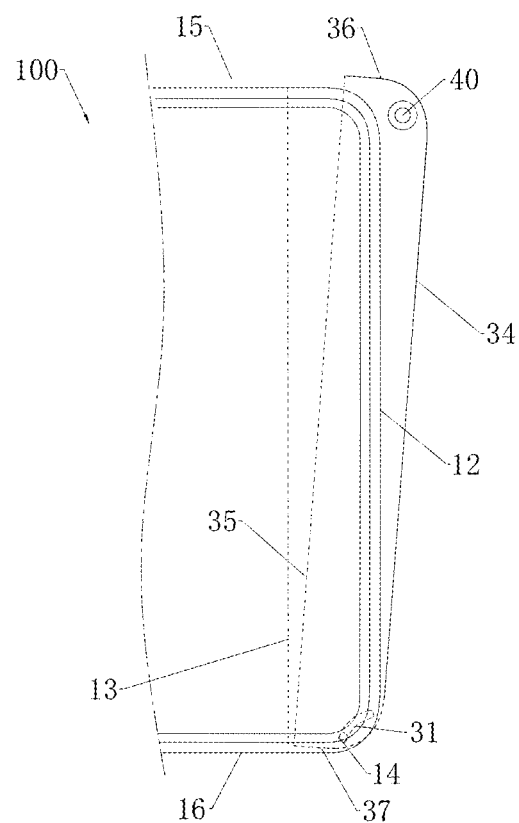
FIG. 28 illustrates a structural diagram of a mobile terminal according to another embodiment of the present disclosure.
Figure 29:
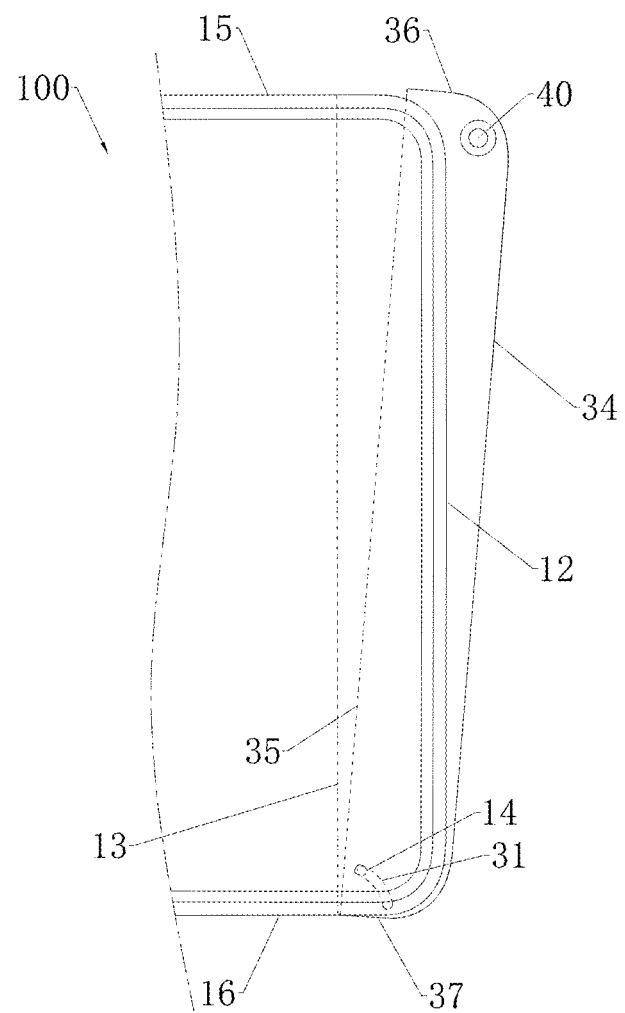
FIG. 29 illustrates a structural diagram of a mobile terminal according to another embodiment of the present disclosure.

When the first side surface 12 is the right side surface of the housing 10, the details of the location of the recess 13 may be referred to FIG. 28 and FIG. 29. FIG. 28 shows that the axis of the curved slot 31 is in the junction of the third side wall 34 and the fifth side wall 36. FIG. 29 shows that the axis of the curved slot 31 is in the junction of the fourth side wall 35 and the fifth side wall 37. Further, when the first side surface 12 is the left side surface of the housing 10, the detail of the recess 13 is not described here, please see FIG. 30 and FIG. 31.

Figure 30:
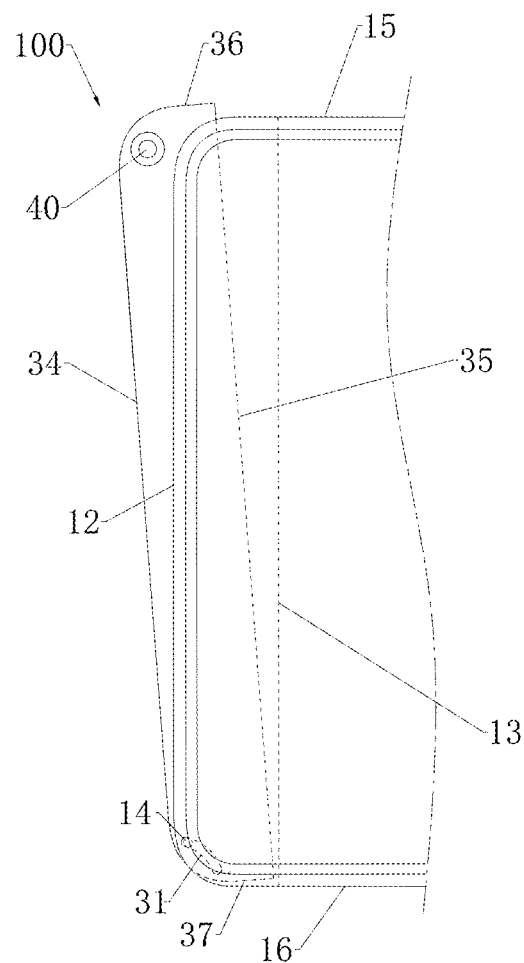
FIG. 30 illustrates a structural diagram of a mobile terminal according to another embodiment of the present disclosure.
Figure 31:
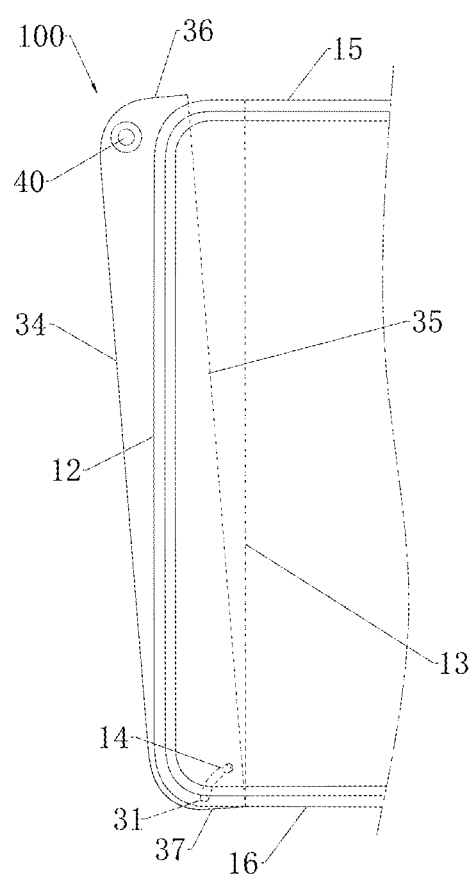
FIG. 31 illustrates a structural diagram of a mobile terminal according to another embodiment of the present disclosure.

FIG. 30 shows that the axis of the curved slot 31 is in the junction of the third side wall 34 and the sixth side wall 37. FIG. 31 shows that the axis of the curved slot 31 is in the junction of the fourth side wall 35 and the sixth side wall 37. Of course, when the first side surface 12 is the left side or the right side of the housing 10, the axis of the curved slot 31 has other forms, but it will not be enumerated here.

Figure 32:
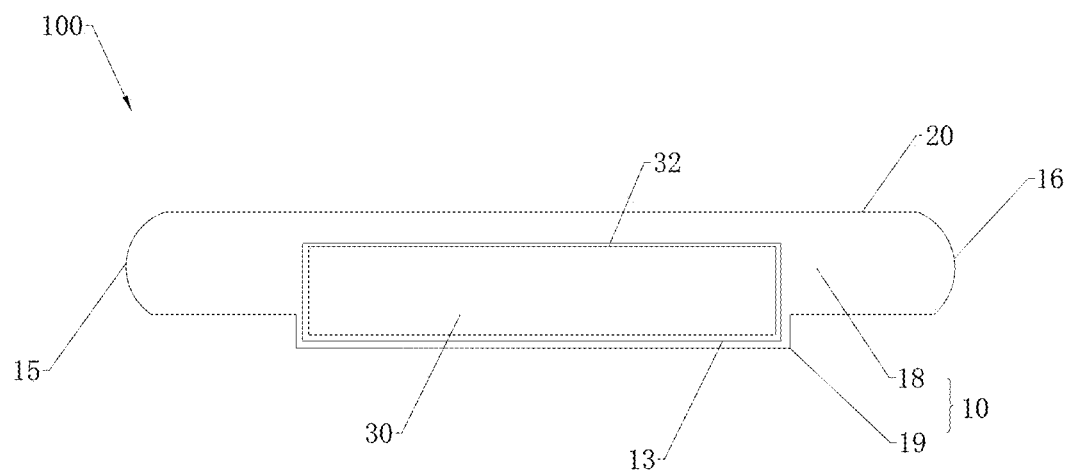
FIG. 32 illustrates a structural diagram of a mobile terminal according to another embodiment of the present disclosure.

In one embodiment as shown in FIG. 32, the housing 10 includes a main body portion 18 and a protrusion portion 19. The protrusion 19 protrudes from the surface far away from the display screen 20 of the main body portion 18. A portion of the recess 13 is formed in the protrusion portion 19. Another portion of the recess 13 is formed in the main body portion 18. In detail, the top surface of the protrusion portion 19 is flush with the top surface of the main body portion 18, that is, the top surface of the protrusion portion 19 and the top surface of the main body portion 18 forms the top surface of the housing 10. When a part of the recess 13 is provided in the protrusion portion 19, and another portion of the recess 13 is in the main body portion 18. Here, in the embodiment, the recess 13 is spaced apart from the second side surface 15 and the third side surface 16, that is, the recess 13 fails to throughout the second side surface 15 and the third side surface 16.

In the present embodiment, the rotating member 30 is rotated relative to the housing 10 in a variety of manners.

Figure 33:
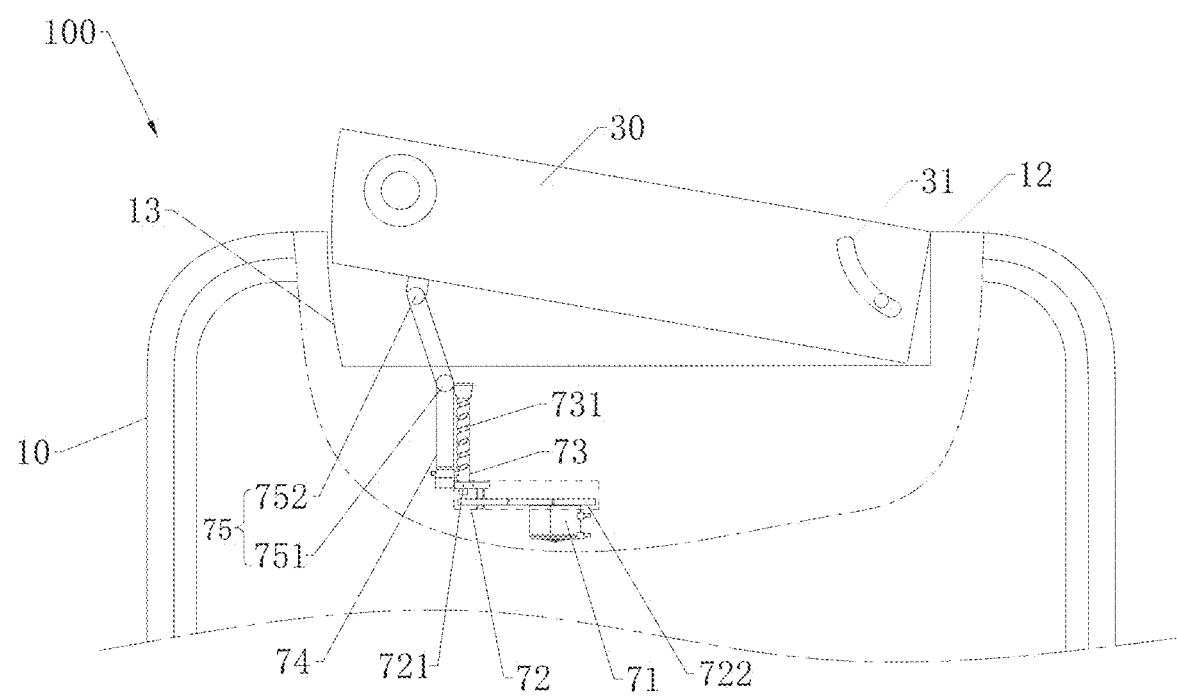
FIG. 33 illustrates a structural diagram of a mobile terminal according to another embodiment of the present disclosure.

In one embodiment, as shown in FIG. 33, the mobile terminal 100 includes a driving device 71, a gear set 72, a screw shaft 73, a drive rod 74, and a push rod 75. The driving device 71 may be, but is not limited to, a motor. The driving device 71, the gear set 72, and the screw shaft 73 are provided inside the housing 10. The screw shaft 73 is fixedly coupled to the output end 721 of the gear set 72. A spiral groove 731 is provided on the outer peripheral side of the screw shaft 73, and one end of the drive rod 74 is partially fitted into the spiral groove 731 to be slidably coupled to the screw shaft 73. The push rod 75 includes a first end 751 and a second end 752 disposed opposite to the first end 751. The first end 751 is rotatably connected to the other end of the drive rod 74. The second end 752 is hinged to the rotating member 30 at one end away from the curved slot 31. The driving device 71 is used to drive the input end 722 of the gear set 72 to rotate, so that the output end 721 of the gear set 72 drives the screw shaft 73 to rotate, the drive rod 74 slides relative to the screw rod 73, and the push rod 75 drives the rotating member 30 to turn into or out of the recess 13. It will be appreciated that the input end 722 of the gear set 72 may be either a gear or a rotating shaft. The output end 723 of the gear set 72 may be a gear or a fixed shaft.

Figure 34:
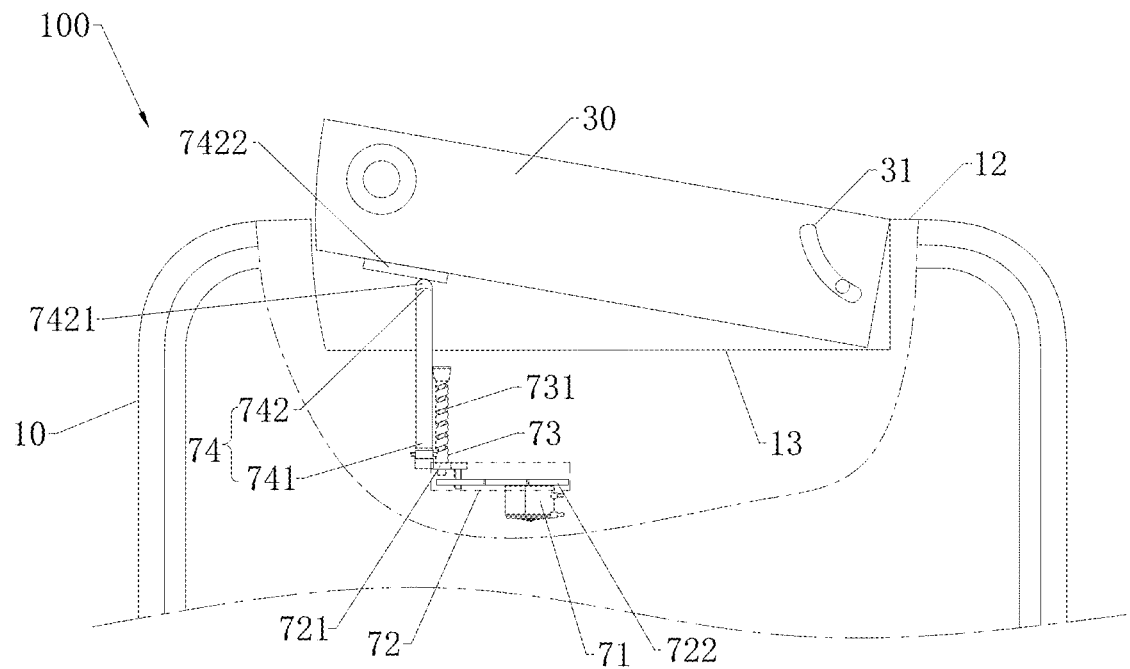
FIG. 34 illustrates a structural diagram of a mobile terminal according to another embodiment of the present disclosure.

In another embodiment, as shown in FIG. 34, the mobile terminal 100 includes a driving device 71, a gear set 72, a screw shaft 73, and a drive rod 74. The driving device 71 may be, but is not limited to, a motor. The driving device 71, the gear set 72, and the screw shaft 73 are provided inside the housing 10. The screw shaft 73 is fixedly coupled to the output end 721 of the gear set 72. A spiral groove 731 is provided on the outer peripheral side of the screw shaft 73. One end of the drive rod 74 is partially fitted into the spiral groove 731 to slidably connected to the screw shaft 73. The other end of the drive rod 74 is magnetically connected to the rotating member 30 at one end away from the curved slot 31. The driving device 71 is configured to drive the input end 722 of the gear set 72 to rotate, so that the output end 721 of the gear set 72 drives the screw shaft 73 to rotate, and the drive rod 74 slides relative to the screw shaft 73 to drive the rotating member 30 to rotate into or out of the recess 13. It will be appreciated that the input end 722 of the gear set 72 may be either a gear or a rotating shaft. The output end 723 of the gear set 72 may be a gear or a fixed shaft.

In one embodiment, as shown in FIG. 34, the drive rod 74 includes a first end portion 741 and a second end portion 742 disposed opposite to the first end portion 741. The first end portion 741 is partially embedded in the spiral groove 731 to be slidably coupled to the screw shaft 73. The second end portion 742 is provided with a first magnetic member 7421. A second magnetic member 7422 is disposed at one end of the rotating member 30 away from the curved slot 31. The first magnetic member 7421 is a strip-shaped block. The second magnetic member 7422 is a semi-spherical shape. When the rotating member 30 is turned out of the recess 13, the first magnetic member 7421 slides from one end of the second magnetic member 7422 to the other end. When the rotating member 30 is turned into the recess 13, the first magnetic member 7421 slides from the other end of the second magnetic member 7422 to the end. Therefore, the second magnetic member 7422 may be connected to the rotating member 30 through the magnetic force of the first magnetic member 7421, that is, the push rod 75 and the rotating member 30 are prevented from being separated during the rotation of the rotating member 30, and the first magnetic member 7421 may be rotated relative to the second magnetic member 7422.

Figure 35:
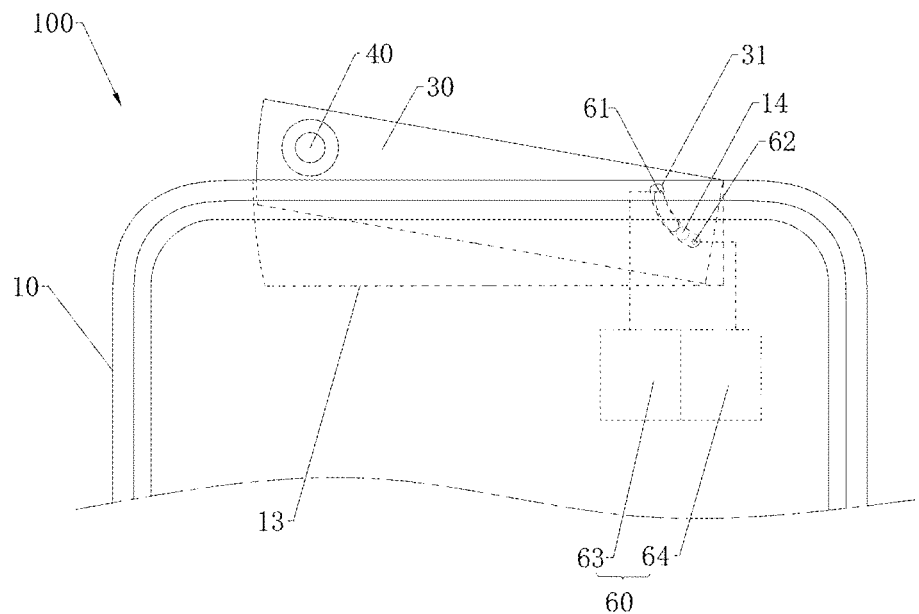
FIG. 35 illustrates a structural diagram of a mobile terminal according to another embodiment of the present disclosure.

In another embodiment, as shown in FIG. 35, the mobile terminal 100 includes a cylinder set 60, a first air bag 61 and second air bag 62. The first air bag 61 is located between one end of the curved slot 31 and the slider 14. The second air bag 62 is located between the other end of the curved slot 31 and the slider 14. The first air bag 61 and the second air bag 62 are connected to the air cylinder set 60, respectively. The cylinder set 60 is for inflating the first air bag 61 and pumping the second air bag 62. The cylinder set 60 is also used to evacuate the first air bag 61 and inflate the second air bag 62. In one embodiment, the cylinder set 60 includes a first cylinder 63 and a second cylinder 64 spaced apart from the first cylinder 63. The first cylinder 63 communicates with the first air bag 61. The first cylinder 63 is used to inflate or evacuate the first air bag 61. The second cylinder 64 communicates with the second air bag 62. The second cylinder 64 is used to inflate or evacuate the second air bag 62. Specifically, when the first cylinder 63 inflates the first air bag 61, the second cylinder 64 evacuates the second air bag 62, the slider 14 slides along the curved slot 31 by the first air bag 61 pushing. At this time, the rotating member 30 is turned out of the recess 13 relative to the housing 10.

When the first cylinder 63 inflates the second air bag 62, the second cylinder 64 evacuates the first air bag 61, the slider slides along the curved slot 31 by the second air bag 62 pushing, at this time, the rotating member 30 is turned into the recess 114 relative to the housing 10.

Figure 36:
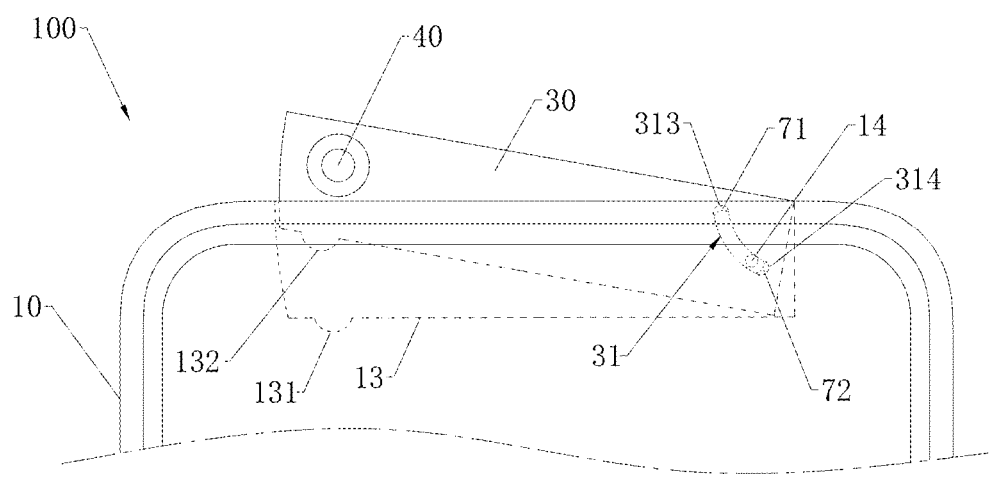
FIG. 36 illustrates a structural diagram of a mobile terminal according to another embodiment of the present disclosure.

In other embodiments, the rotating member 30 may be manually dialed to rotate relative to the housing 10. Specifically, as shown in FIG. 36, the first end wall 313 of the curved slot 31 is provided with a first magnetic plate 71. The second end wall 314 of the curved slot 31 is provided with a second magnetic sheet 72. When the camera module 40 is imaging, the end of the rotating member 30 away from the of the curved slot 31 is dialed by the hand, or by pressing the rotating member 30 on the end provided with the curved slot 31, to rotate the rotating member 30 around the axis out of the recess 13. At this time, the slider 14 attracts the first magnetic sheet 71. The rotating member 30 is fixed relative to the housing 10 to facilitate the shooting. Further, when it is unnecessary for the camera module 40 shooting, the end of the rotating member 30 away from the of the curved slot 31 is dialed by the hand, or by pressing the rotating member 30 on the end provided with the curved slot 31, the rotating member 30 is rotated into the recess 13. The slider 14 attracts the second magnetic sheet 72, and the rotating member 30 is fixed relative to the housing 10, thereby preventing the rotating member 30 from being dropping out of the recess 13 during use.

Further, as shown in FIG. 36, a recessed area 131 is formed in the recess 13. The rotating member 30 is provided with a limiting block 132. When the rotating member 30 is turned into the recess 13, the limiting block 132 and the recessed area 131 is connected by an interference connection or a snap connection. At this time, when the rotating member 30 is turned into the recess 13, since the limiting block 132 is restrained in the recessed portion 131, the rotating member 30 is further fixed to the housing 10 to enhance the connection of the rotating member 30.

Figure 37:
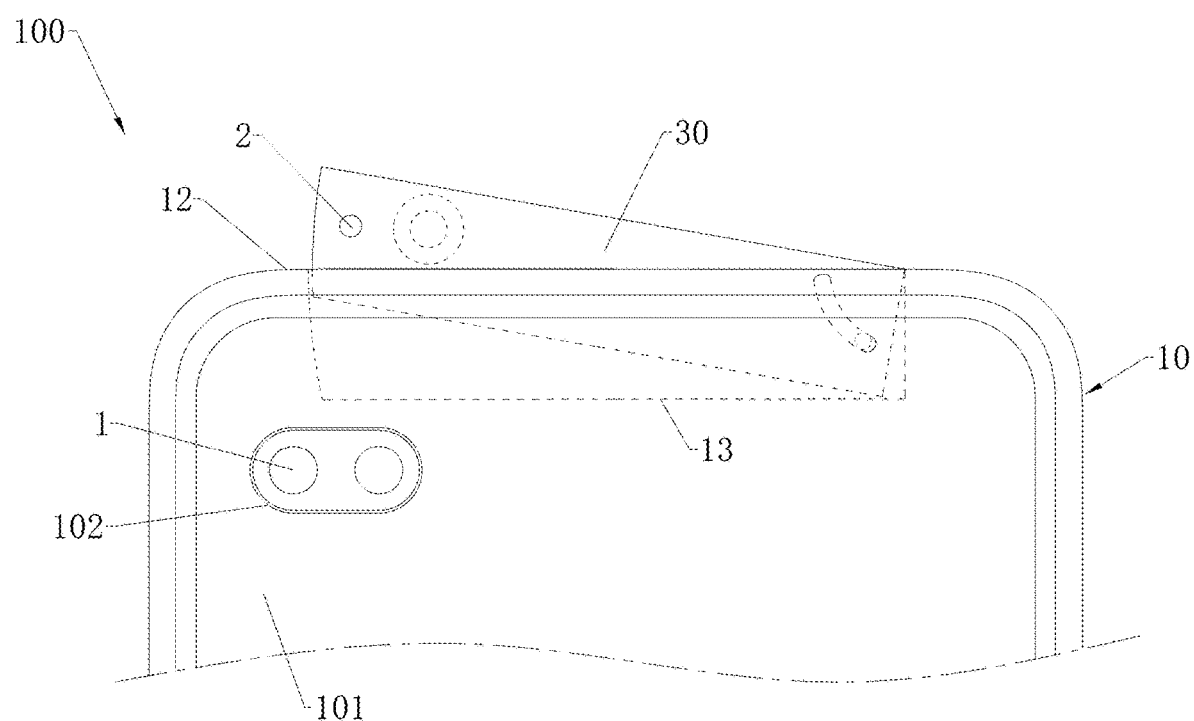
FIG. 37 illustrates a structural diagram of a mobile terminal according to another embodiment of the present disclosure.
Figure 38:
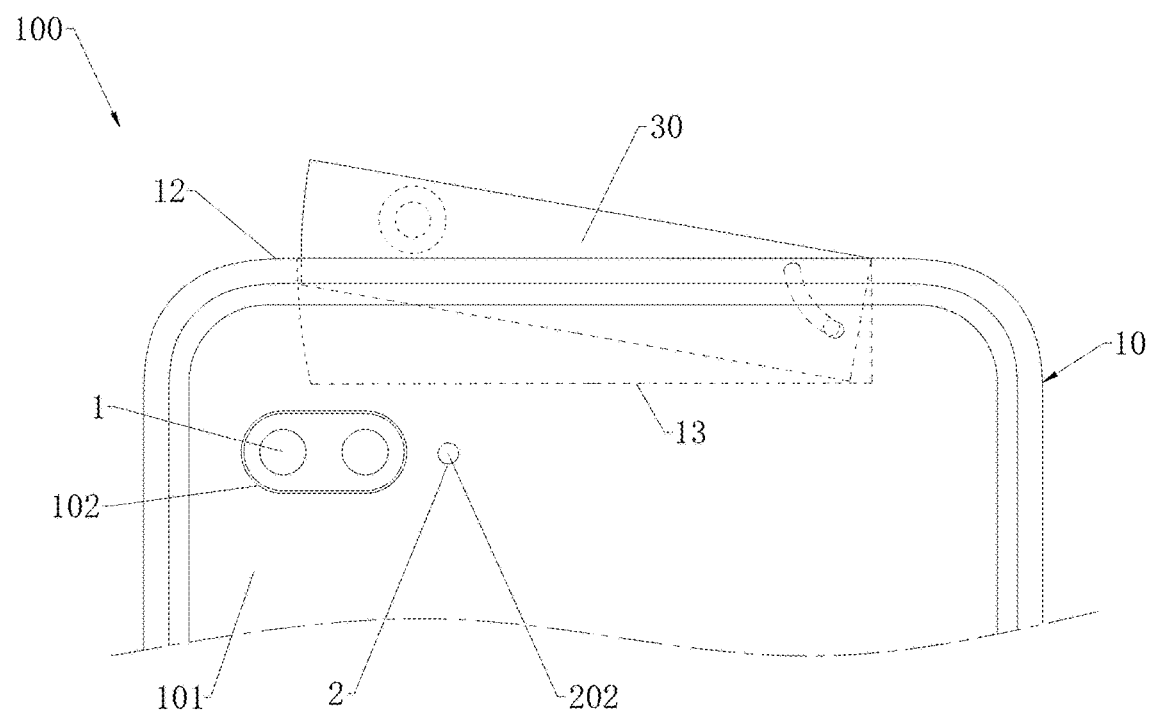
FIG. 38 illustrates a structural diagram of a mobile terminal according to another embodiment of the present disclosure.

In the present embodiment, as shown in FIGS. 37 and 38, the housing 10 includes a back surface 101 opposite to the front surface 11. The back surface 101 is connected to the first side surface 12. The housing 10 has a light transmission hole 102. The opening of the light transmission hole 102 is provided in the back surface 101. The mobile terminal 100 includes a camera module 1 and a flash 2. The camera module 1 is mounted inside the housing 10, and the camera module 2 collects light through the light transmission hole 102. The orientation of a light emitting face 202 of the flash 2 is opposite to the orientation of the display screen 20. Among them, the flash 2 is set in a variety of ways.

In a first embodiment, as shown in FIG. 37, the flash 2 is disposed on the rotating member 30. When the rotating member 30 is turned into the recess 13, the flash 2 overlaps with the housing 10. When the rotating member 30 is turned out of the recess 13, the flash 2 is exposed relative to the housing 10. Specifically, when the user performs image capturing in an environment with sufficient ambient light, the user does not need to use the flash 2, the rotating member 30 may be turned into the recess 13 to receive the flash 2 in the recess 13, thereby preventing the flash 2 from being damaged due to long-term exposure to the outside of the housing 10, and to reduce the openings in the housing 10 to ensure a simple appearance of the mobile terminal 100. In addition, when the user performs image capturing in a dark environment, the user only needs to turn the rotating member 30 out of the recess 13, so that the rotating member 30 carries the emission surface of the flash 2 to be exposed, and cooperate with the camera module 1 photographing.

In another embodiment, as shown in FIG. 38, the flash 2 is mounted inside the housing 10. It may be understood that when the camera module 1 is photographed in an environment where the outside light is dark, the flash 2 may increase the exposure amount of the camera module 1 to ensure the photographing quality of the camera module 1.

Figure 39:
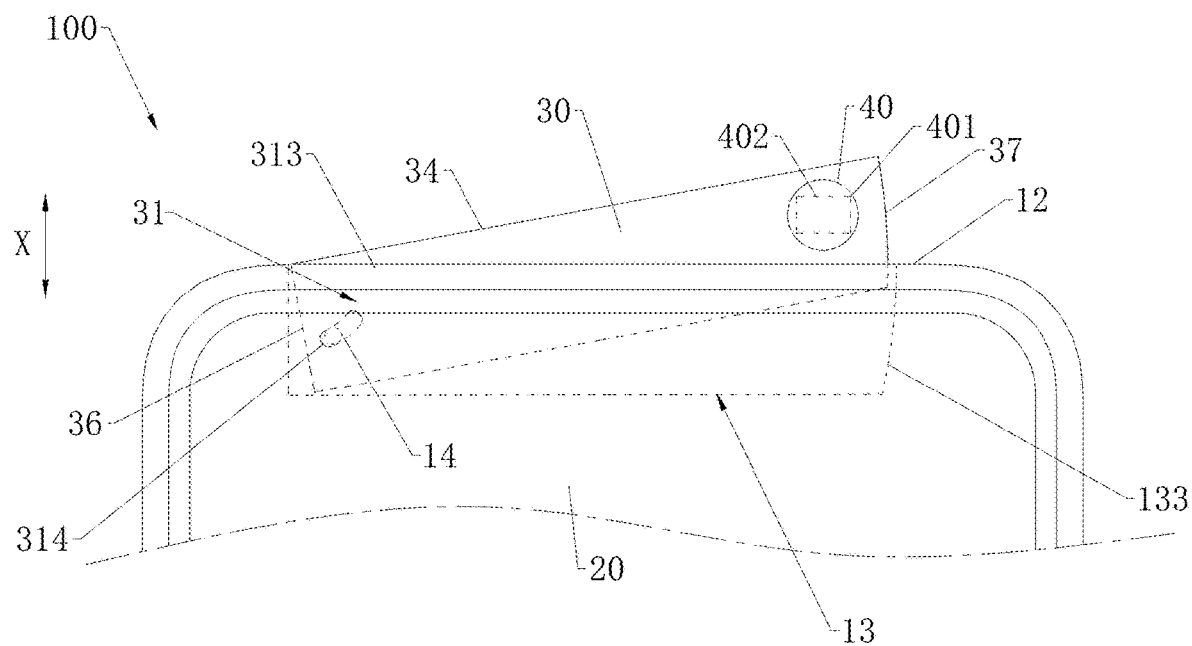
FIG. 39 illustrates a structural diagram of a mobile terminal according to another embodiment of the present disclosure.
Figure 40:
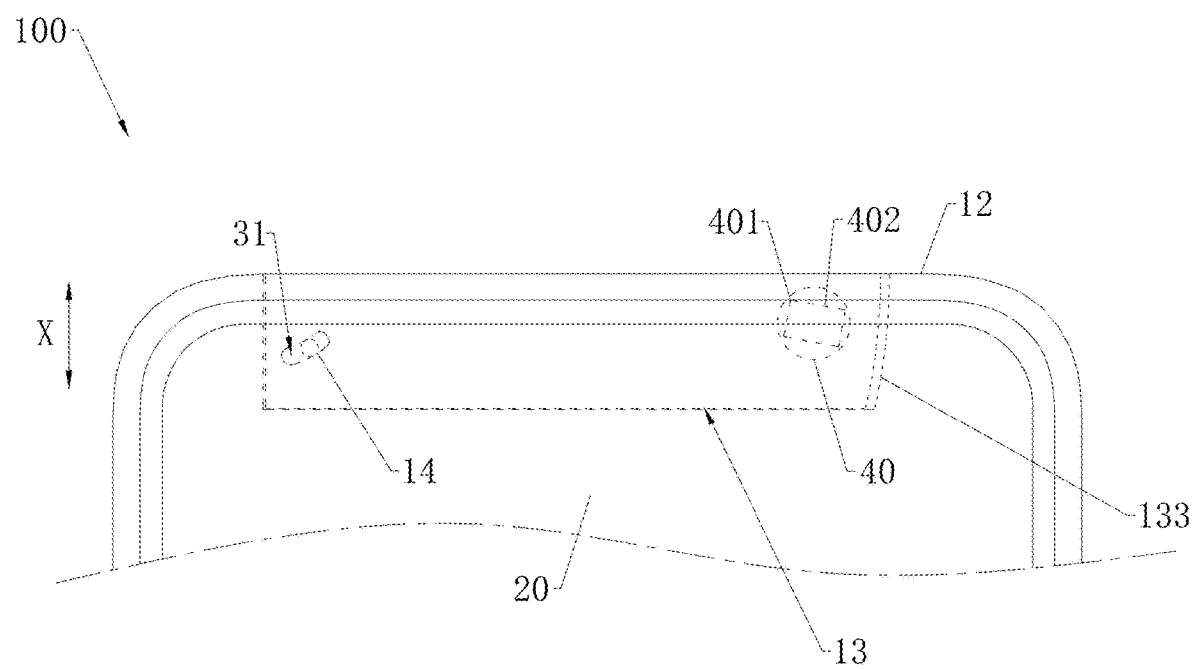
FIG. 40 illustrates a structural diagram of the mobile terminal shown in FIG. 39 in another use state.

Optionally, as shown in FIG. 39 and FIG. 40, a pixel array area 401 of the photosensitive element in the camera module 40 has a rectangular area. The photosensitive element, that is, the image sensor, may be a CCD (Charge Coupled Device) or a CMOS (Complementary Metal Oxide Semiconductor). The pixel array area 401 of the image sensor has a rectangular area, that is, a square area or a rectangular area. The rectangular region includes two long sides 402 and short sides that are oppositely connected between the two long sides 402. The long side 402 of the rectangular area is substantially perpendicular to the short side of the rectangular area.

When the rotating member 30 carries the camera module 40 out of the recess 13, the long side 402 of the rectangular area is substantially parallel or perpendicular to the longitudinal direction X of the mobile terminal 100. As shown in FIG. 39 and FIG. 40, the mobile terminal 100 in the longitudinal direction X is generally the mobile terminal 100 in the vertical direction. When the long side 402 of the rectangular region is substantially perpendicular to the longitudinal direction X, the short side of the rectangular region is substantially parallel to the longitudinal direction X. When the long side 402 of the rectangular area is substantially parallel to the longitudinal direction X, the short side of the rectangular area is substantially perpendicular to the longitudinal direction X. The long side of the display screen 20 may also be substantially parallel to the length direction X of the mobile terminal 100.

In the present embodiment, when the camera module 40 is transferred out of the recess 13, the long side 402 of the a pixel array area 401 is substantially parallel or perpendicular to the mobile terminal 100 in the longitudinal direction X, thus the images acquired by the camera module 40 may be better converted into pictures, and is also convenient to display directly in the display screen 20.

By applying the orientation of the pixel array area 401 of the camera module 40, the image processing chip inside the mobile terminal 100 may process images by using a conventional algorithm, thereby reducing the production cost of the mobile terminal 100.

In one embodiment, the first side surface 12 may be the top surface of the mobile terminal 100. The first side surface 12 is substantially perpendicular to the longitudinal direction X. In other embodiments, the first side surface 12 may also be the left side surface, the right side surface or the bottom surface of the mobile terminal 100.

In one embodiment, the camera module 40 is fixed relative to the rotating member 30. When the rotating member 30 carries the camera module 40 into the recess 13, the long side 402 of the rectangular area is inclined with respect to the longitudinal direction X of the mobile terminal 100. That is, an obtuse or acute angle is formed between the long side 402 of the rectangular area and the length direction X of the mobile terminal 100.

In other embodiments, the camera module 40 may be rotated relative to the rotating member 30. The location relationship between the long side 402 of the rectangular region of the camera module 40 and the longitudinal direction X is changed as the location relationship between the rotating member 30 and the longitudinal direction X changes.

While the disclosure has been described in terms of what is presently considered to be the most practical and preferred embodiments, it is to be understood that the disclosure need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mobile terminal, comprising:
   a housing, defining a recess and comprising a first engaging structure, a body portion and a protrusion portion;
   a display screen, positioned in the housing, wherein the display screen comprises a displaying surface, the body portion is flush with the displaying surface, and the protrusion portion is protruded from the body portion away from the displaying surface, a part of the recess is disposed in the protrusion portion, and another portion of the recess is disposed in the body portion;
   a functional module; and
   a rotating member, rotatably coupled to the housing, wherein the functional module is disposed on the rotating member, the rotating member comprises a second engaging structure cooperated with the first engaging structure, one of the first engaging structure and the second engaging structure is a curved slot communicated with the recess, the other one of the first engaging structure and the second engaging structure is a slider slidably engaged in the curved slot thereby enabling the rotating member to rotate according to an axis of the curved slot, the functional module is selectively positioned in the recess or exposed from the housing, wherein the axis is defined out of the housing, and the functional module keeps facing the same direction as the display screen when the rotating member is positioned in the recess.

2. The mobile terminal of claim 1, wherein the functional module is disposed on an end of the rotating member far away from the second engaging structure.

3. The mobile terminal of claim 1, wherein the axis of the curved slot is defined at an intersection of the rotating member and the housing.

4. The mobile terminal of claim 1, wherein the axis of the curved slot is perpendicular to the display screen.

5. The mobile terminal of claim 1, wherein the housing further comprises a body portion and a protrusion portion, the display screen comprises a displaying surface, the body portion is flush with the displaying surface, and the protrusion portion is protruded from the body portion away from the displaying surface, a part of the recess is disposed in the protrusion portion, and remaining part of the recess is disposed in the body portion.

6. The mobile terminal of claim 1, wherein the axis of the curved slot is the only axis of the rotating member.

7. The mobile terminal of claim 1, wherein the curved slot is defined in the housing, and the slider is disposed on the rotating member.

8. The mobile terminal of claim 1, wherein the curved slot is defined in the rotating member, and the slider is disposed in the housing.

9. The mobile terminal of claim 1, wherein the housing defines a first auxiliary unit, and the rotating member comprises a second auxiliary unit, one of the first auxiliary unit and the second auxiliary unit is an auxiliary slot communicated with the recess, the other one of the first auxiliary unit and the second auxiliary unit is an auxiliary slider slidably engaged in the auxiliary slot.

10. The mobile terminal of claim 9, wherein the first auxiliary unit is spaced apart from the first engaging structure, the second auxiliary unit is spaced apart from the second engaging structure.

11. The mobile terminal of claim 9, wherein the auxiliary slot and the curved slot are arranged coaxially.

12. The mobile terminal of claim 9, wherein the auxiliary slot and the curved slot follows a same curve and a different radius.

13. The mobile terminal of claim 1, wherein the mobile terminal comprises a front surface and a back surface opposite to the front surface, the recess is defined between the front surface and the back surface.

14. The mobile terminal of claim 1, wherein the housing comprises a front surface, a back surface opposite to the front surface, a first side surface, a second side surface, a third side surface and a fourth side surface, the first side surface, the second side surface, the third side surface and the fourth side surface are connected end to end to form a profile of the housing, the functional module is capable of arising from the first side surface, the second side surface, the third side surface or the fourth side surface.

15. A mobile terminal, comprising:
a housing, defining a recess and comprising a first engaging structure, a body portion and a protrusion portion;
a display screen, positioned in the housing, wherein the display screen comprises a displaying surface, the body portion is flush with the displaying surface, and the protrusion portion is protruded from the body portion away from the displaying surface, a part of the recess is disposed in the protrusion portion, and another portion of the recess is disposed in the body portion;
a camera module; and
a rotating member, rotatably coupled to the housing, wherein the camera module is disposed on the rotating member, the rotating member comprises a second engaging structure cooperated with the first engaging structure, one of the first engaging structure and the second engaging structure is a curved slot communicated with the recess, the other one of the first engaging structure and the second engaging structure is a slider slidably engaged in the curved slot thereby enabling the rotating member to rotate according to an axis of the curved slot, the camera module is selectively positioned in the recess or exposed from the housing, wherein the axis of the curved slot is perpendicular to the display screen and defined out of the housing, and the camera module keeps facing the same direction as the display screen when the rotating member is positioned in the recess.

16. The mobile terminal of claim 15, wherein the camera module is disposed on one end of the rotating member far away from the second engaging structure.

17. The mobile terminal of claim 15, wherein the rotating member provides at least one entire exterior surface to be a side surface of the housing.

18. The mobile terminal of claim 15, wherein the curved slot comprises a first end wall and a second end wall which are oppositely disposed, the first end wall is provided with a first magnetic sheet, the second end wall is provided with a second magnetic sheet thereby enabling the slider to attract the first magnetic sheet when the rotating member is turned out of the recess, and enabling the slider to attract the second magnetic sheet when the rotating member is turned into the recess.

19. A mobile terminal, comprising:
a housing, defining a recess and comprising a first engaging structure, a body portion and a protrusion portion;
a display screen, positioned in the housing, wherein the display screen comprises a displaying surface, the body portion is flush with the displaying surface, and the protrusion portion is protruded from the body portion away from the displaying surface, a part of the recess is disposed in the protrusion portion, and another portion of the recess is disposed in the body portion;
a functional module; and
a rotating member, rotatably coupled to the housing, wherein the functional module is mounted on the rotating member, the rotating member comprises a second engaging structure cooperated with the first engaging structure, one of the first engaging structure and the second engaging structure is a curved slot communicated with the recess, the other one of the first engaging structure and the second engaging structure is a slider slidably engaged in the curved slot thereby enabling the rotating member to rotate according to an axis of the curved slot, the functional module is selectively positioned in the recess or exposed from the housing, wherein the rotating member keeps covering the recess when the rotating member is turned out of the recess.

20. The mobile terminal of claim 19, wherein a curvature of the curved slot is less than or equal to $2\pi/5$.

* * * * *